US011990710B2

(12) United States Patent
Chang et al.

(10) Patent No.: US 11,990,710 B2
(45) Date of Patent: May 21, 2024

(54) SHELL-LESS ELECTRICAL CONNECTOR AND METHOD OF MAKING SAME

(71) Applicant: Microsoft Technology Licensing, LLC, Redmond, WA (US)

(72) Inventors: Le Chang, Kirkland, WA (US); David Michael Lane, Sammamish, WA (US); Scott Gerard Loomis, Everett, WA (US); Tung Yuen Lau, Hong Kong (CN)

(73) Assignee: Microsoft Technology Licensing LLC, Redmond, WA (US)

( * ) Notice: Subject to any disclaimer, the term of this patent is extended or adjusted under 35 U.S.C. 154(b) by 118 days.

(21) Appl. No.: 17/289,631

(22) PCT Filed: Nov. 28, 2018

(86) PCT No.: PCT/CN2018/117905

§ 371 (c)(1),
(2) Date: Apr. 28, 2021

(87) PCT Pub. No.: WO2020/107257

PCT Pub. Date: Jun. 4, 2020

(65) Prior Publication Data

US 2021/0399500 A1 Dec. 23, 2021

(51) Int. Cl.
*H01R 13/6593* (2011.01)
*H01R 13/6596* (2011.01)
(Continued)

(52) U.S. Cl.
CPC ..... *H01R 13/6593* (2013.01); *H01R 13/6596* (2013.01); *H01R 24/60* (2013.01); *H01R 43/20* (2013.01); *H01R 13/748* (2013.01)

(58) Field of Classification Search
None
See application file for complete search history.

(56) References Cited

U.S. PATENT DOCUMENTS 9,583,887 B2 2/2017 King et al.
9,590,363 B2 3/2017 Wu et al.
(Continued)

FOREIGN PATENT DOCUMENTS

CN 1988281 A 6/2007
CN 203242848 U 10/2013
(Continued)

OTHER PUBLICATIONS

"Extended European Search Report Issued in European Patent Application No. 18941936.9", dated Jun. 14, 2022, 17 Pages.
(Continued)

*Primary Examiner* — Oscar C Jimenez
(74) *Attorney, Agent, or Firm* — ArentFox Schiff LLP

(57) ABSTRACT

An electrical connector includes a receptacle connector having a tongue member with a surface extending between first and second tongue ends and having a shoulder extending from the surface adjacent to the second tongue end. The shoulder has a cross-sectional area within a receptacle opening size limit. The receptacle connector further includes a set of electrical contacts each extending through the shoulder between first and second contact ends on opposite sides of the shoulder. The electrical contacts at the first contact end are attached to the tongue surface at the first tongue end. The electrical contacts at the second contact end extend beyond the second tongue end. The receptacle connector further includes an electromagnetic interference (EMI) shielding bracket covering at least a portion of the set of electrical contacts between the first contact end and the shoulder. The disclosure further includes a method of making the electrical connector.

29 Claims, 11 Drawing Sheets

(51) Int. Cl.

| | |
|---|---|
| ***H01R 13/74*** | (2006.01) |
| ***H01R 24/60*** | (2011.01) |
| ***H01R 43/20*** | (2006.01) |

(56) References Cited

U.S. PATENT DOCUMENTS

| | | | | |
|---|---|---|---|---|
| 9,590,364 | B1 * | 3/2017 | Chang | H01R 13/6581 |
| 9,705,243 | B1 | 7/2017 | McCracken et al. | |
| 9,787,009 | B2 | 10/2017 | Tsai et al. | |
| 10,096,947 | B2 * | 10/2018 | Cheng | H01R 24/64 |
| 10,218,126 | B2 * | 2/2019 | Kurosawa | H01R 12/716 |
| 2010/0317220 | A1 | 12/2010 | Shen | |
| 2015/0072548 | A1 | 3/2015 | Chen et al. | |
| 2015/0214669 | A1 | 7/2015 | Chen et al. | |
| 2017/0033511 | A1 | 2/2017 | Hsu et al. | |
| 2017/0033518 | A1 | 2/2017 | Cornelius et al. | |
| 2017/0302033 | A1 | 10/2017 | Peng et al. | |
| 2017/0331229 | A1 * | 11/2017 | Cheng | H01R 24/60 |
| 2018/0034215 | A1 | 2/2018 | Zhong et al. | |
| 2018/0166830 | A1 * | 6/2018 | Feng | H01R 24/64 |
| 2019/0103697 | A1 * | 4/2019 | Amini | H01R 13/6585 |
| 2019/0173237 | A1 * | 6/2019 | Oosaka | H01R 13/26 |
| 2019/0208621 | A1 * | 7/2019 | Lo | H05K 1/0233 |

FOREIGN PATENT DOCUMENTS

| | | | |
|---|---|---|---|
| CN | 103579835 | A | 2/2014 |
| CN | 204243351 | U | 4/2015 |
| CN | 204835065 | U | 12/2015 |
| CN | 205543507 | U | 8/2016 |
| CN | 105990761 | A | 10/2016 |
| CN | 206610971 | U | 11/2017 |
| CN | 206640001 | U | 11/2017 |
| CN | 207124312 | U | 3/2018 |
| TW | 201834322 | A | 9/2018 |

OTHER PUBLICATIONS

"Office Action Issued in Chinese Patent Application No. 201880099590.4", dated Nov. 30, 2022, 25 Pages.

"Office Action Issued in Indian Patent Application No. 202147023351", dated Nov. 17, 2022, 6 Pages.

Universal Serial Bus Type-C Cable and Connector Specification, Retrieved From: https://web.archive.org/web/20141114021549/http://www.those.ch/designtechnik/wp-content/uploads/2014/08/USB-Type-C-Specification-Release-1.0.pdf, Aug. 11, 2014, 171 Pages.

International Search Report and Written Opinion issued in International Patent Application No. PCT/CN2018/117905 dated Sep. 2, 2019.

"Second Office Action and Search Report Issued in Chinese Patent Application No. 201880099590.4", Mailed Date: Aug. 11, 2023, 17 Pages.

Office Action received for Chinese Application No. 201880099690.4, mailed on Nov. 22, 2023, 17 pages (English Translation Provided).

Communication pursuant to Article 94(3) Received for European Application No. 18941936.9, mailed on Feb. 29, 2024, 7 pages.

* cited by examiner

SHELL-LESS ELECTRICAL CONNECTOR AND METHOD OF MAKING SAME

CROSS-REFERENCE TO RELATED APPLICATION(S)

This application is a 35 U.S.C. § 371 National Phase Application of PCT Application No. PCT/CN2018/117905 filed on Nov. 28, 2018, the disclosure of which is hereby expressly incorporated by reference herein in its entirety.

BACKGROUND

The present disclosure relates generally to electrical connectors.

Generally, two electrical devices, such as a personal computer and a peripheral device, may exchange electrical power, ground reference, and/or communication signals through a hardware interface such as an electrical connector. One type of an electrical connector is a Universal Serial Bus (USB) Type C (USB-C) connector as defined by the USB Implementers Forum (USB IF). Generally, a conventional USB-C receptacle connector includes an outer metal shell for electro-magnetic interference (EMI) shielding, grounding and mechanical support, and is soldered to a printed circuit board. This conventional design has a number of inherent problems. For example, because the USB-C receptacle connector is soldered to a circuit board, and the circuit board is mounted to a device enclosure, it may be difficult to align the USB-C receptacle connector to a corresponding opening in a device enclosure. Further, the metal shell is usually visible from the outside of the device, which is undesirable in terms of industrial design. Additionally, a new/updated design of a device having an opening within which the USB-C receptacle connector is to be positioned must be designed to meet existing opening-to-receptacle dimensions, which may require costly new design and/or tooling for configuring the receptacle opening. Accordingly, more practical, aesthetically-pleasing, and cost-effective electrical connectors are needed.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an implementation, an electrical connector assembly includes a receptacle connector assembly, where the receptacle connector assembly includes a tongue member having a body with a first tongue surface extending between a first tongue end and a second tongue end and having a shoulder extending from the first tongue surface adjacent to the second tongue end. The shoulder has a cross-sectional area within a receptacle opening size limit. The receptacle connector assembly further includes a first set of electrical contacts each extending through the shoulder of the tongue member between a first contact end and a second contact end that are on opposite sides of the shoulder. The first set of electrical contacts at the first contact end are attached to the first tongue surface at the first tongue end. The first set of electrical contacts at the second contact end extend beyond the second tongue end. The receptacle connector assembly further includes a first electromagnetic interference (EMI) shielding bracket covering at least a first portion of the first set of electrical contacts between the first contact end and the shoulder of the tongue member.

In a further implementation, an electrical connector kit includes a receptacle connector kit, and the receptacle connector kit includes a tongue member having a body with a first tongue surface extending between a first tongue end and a second tongue end and having a shoulder extending from the first tongue surface adjacent to the second tongue end. The shoulder has a cross-sectional area within a receptacle opening size limit. The receptacle connector kit further includes a first set of electrical contacts each extendable through the shoulder of the tongue member between a first contact end and a second contact end that are on opposite sides of the shoulder. The first set of electrical contacts at the first contact end are attachable to the first tongue surface at the first tongue end. The first set of electrical contacts at the second contact end are extendable beyond the second tongue end. The receptacle connector kit further includes a first EMI shielding bracket configured to cover at least a first portion of the first set of electrical contacts positionable between the first contact end and the shoulder of the tongue member.

In another implementation, a computing device includes an electrical connector assembly configured to electrically connect the computing device to another computing device. The electrical connector assembly includes a first set of coaxial cables having a first cable end and a second cable end, and a coaxial connector electrically connected to the second cable end. The electrical connector assembly further includes a receptacle connector assembly including a tongue member having a body with a first tongue surface extending between a first tongue end and a second tongue end and having a shoulder extending from the first tongue surface adjacent to the second tongue end. The shoulder has a cross-sectional area within a receptacle opening size limit. The receptacle connector assembly further includes a first set of electrical contacts each extending through the shoulder of the tongue member between a first contact end and a second contact end that are on opposite sides of the shoulder, where the first set of electrical contacts at the first contact end are attached to the first tongue surface at the first tongue end, and the first set of electrical contacts at the second contact end extend beyond the second tongue end. Each coaxial cable of the first set of coaxial cables is electrically connected to a respective one of the first set of electrical contacts at the second contact end. The receptacle connector assembly further includes a first EMI shielding bracket covering at least a first portion of the first set of electrical contacts between the first contact end and the shoulder of the tongue member.

In yet another implementation, a method of making an electrical connector includes assembling a first set of electrical contacts and a second set of electrical contacts on opposite surfaces of a center plate to obtain an inner assembly. The method may further include first electrically connecting, subsequent to the assembling, a first EMI shielding bracket and a second EMI shielding bracket on the opposite surfaces of the center plate, where the first EMI shielding bracket covers at least a first portion of the first set of electrical contacts, and the second EMI shielding bracket covers at least a first portion of the second set of electrical contacts. The method may further include second electrically connecting, subsequent to the first electrically connecting, a mounting member to the inner assembly. The method may further include attaching a tongue member onto the inner assembly subsequent to the second electrically connecting, where the tongue member has a body with a first tongue surface and a second tongue surface opposite the first tongue surface both extending between a first tongue end and a second tongue end, where the body has a shoulder extending adjacent to the second tongue end from the first tongue surface and from the second tongue surface, and the shoulder has a cross-sectional area within a receptacle opening size limit.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

BRIEF DESCRIPTION OF THE DRAWINGS

The disclosed implementations will hereinafter be described in conjunction with the appended drawings, provided to illustrate and not to limit the disclosed implementations, wherein like designations denote like elements, and in which.

DETAILED DESCRIPTION

Figure 1:
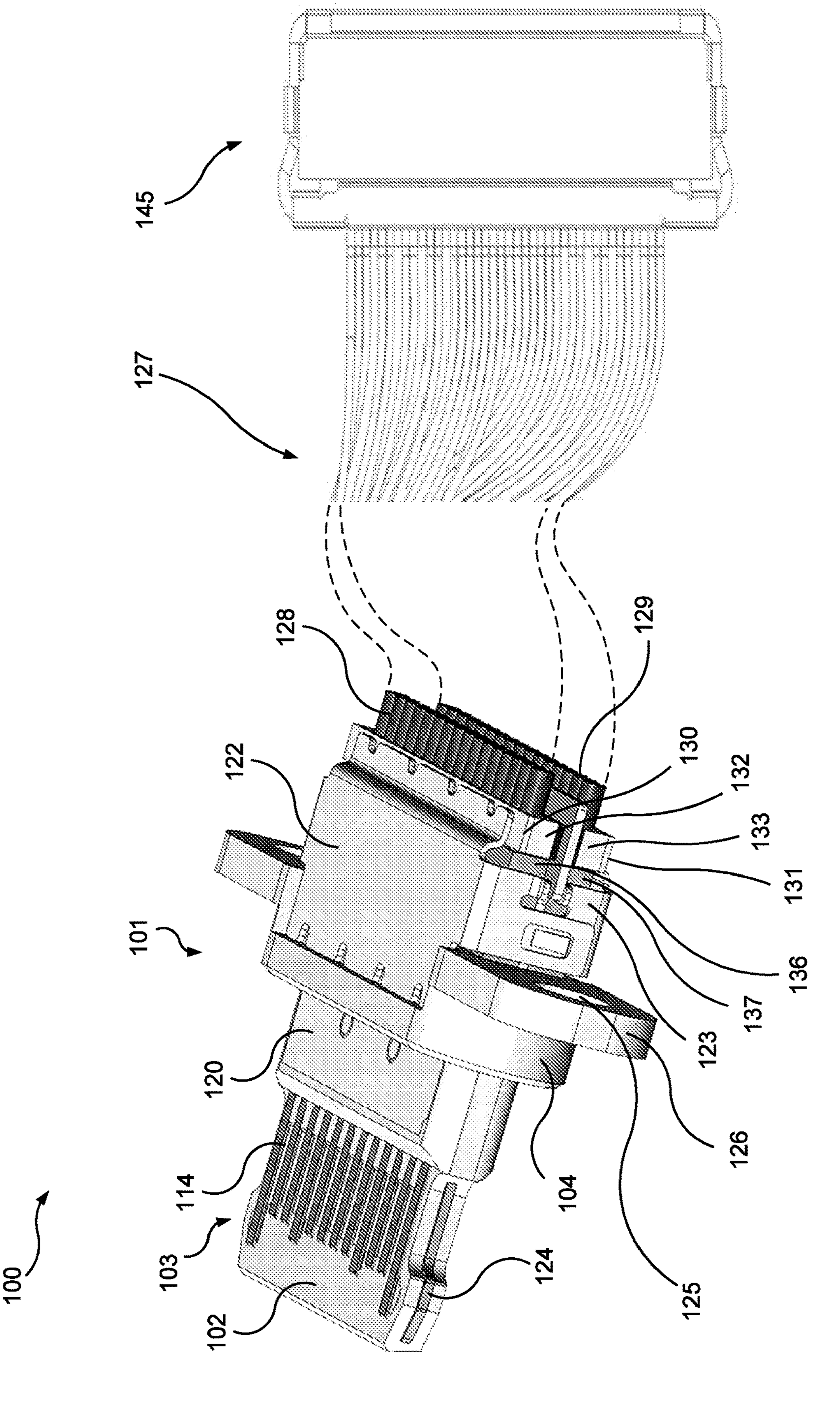
FIG. 1 is a top perspective view of components of an example electrical connector assembly.
Figure 2:
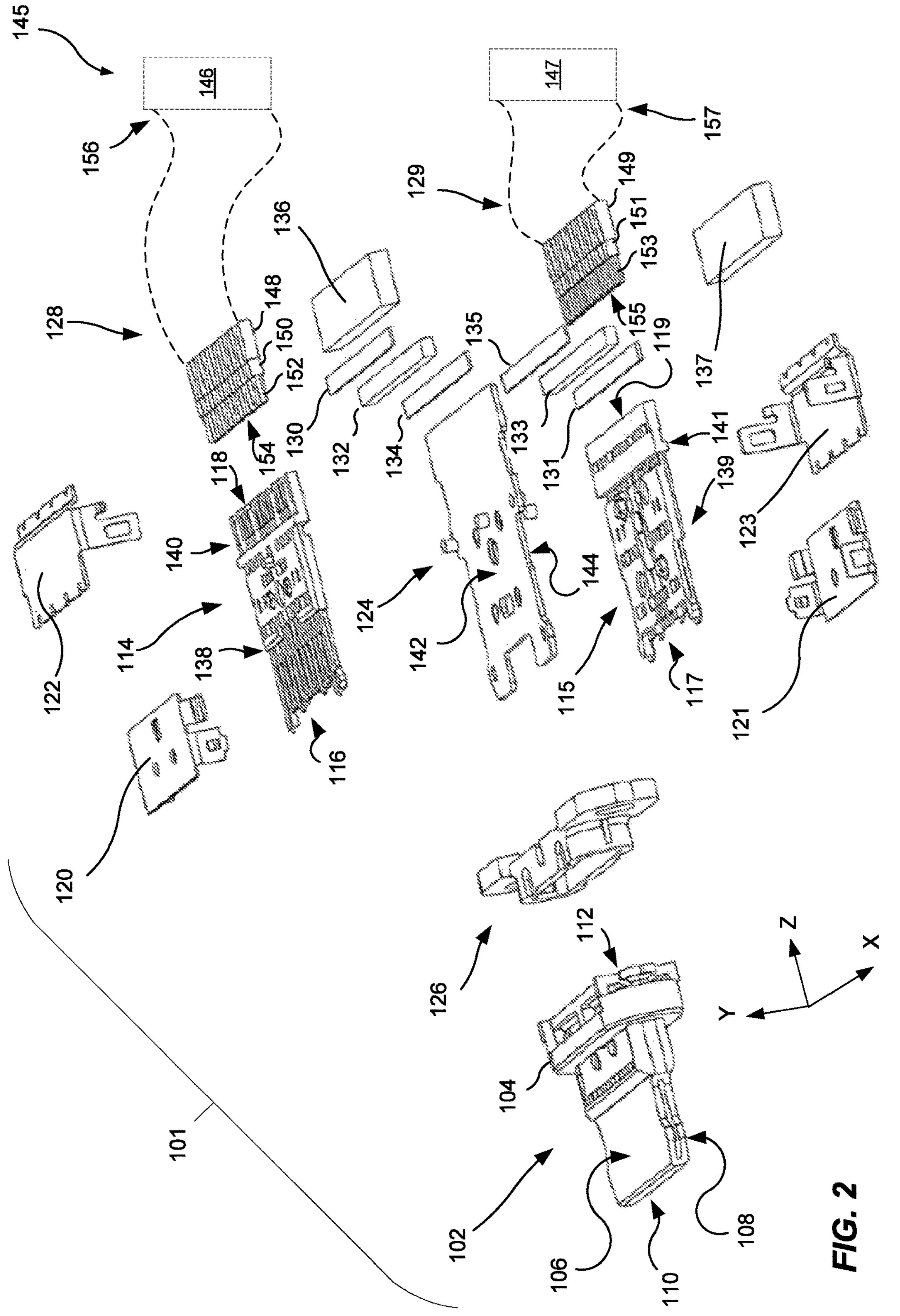
FIG. 2 is an exploded top perspective view of the components of the example electrical connector assembly of FIG. 1.
Figure 4:
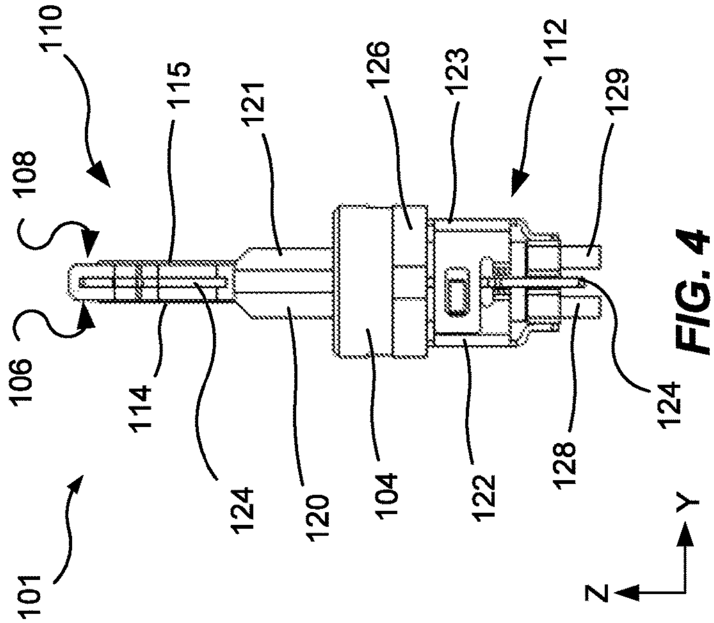
FIG. 4 is a side view of the receptacle connector assembly of the electrical connector assembly of FIG. 1, and the opposite side view is a mirror image.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

The present disclosure includes a shell-less receptacle connector, such as a shell-less Universal Serial Bus (USB) Type C (USB-C) receptacle connector, that does not have a conventional outer metal shell but instead includes one or more electromagnetic interference (EMI) shielding brackets adjacent to electrical contacts and wires/cables to provide EMI shielding of electrical signals communicated through the receptacle connector. Some implementations of the shell-less receptacle connector may further include high-speed coaxial cables electrically connected to the contacts of the receptacle connector, and also connected (e.g., at an opposite end) to a coaxial connector that is connectable to a circuit board in a device. This configuration allows the connector assembly to be highly flexible and easily adaptable to being mounted in various positions. The shell-less receptacle connector, high-speed coaxial cables, and the coaxial connector may be referred to as an electrical connector assembly.

Generally, a conventional surface-mount technology (SMT)—type USB-C receptacle connector includes an outer metal shell, spaced apart from internal electrical circuits, for EMI shielding, grounding, and mechanical support. Further, the conventional USB-C receptacle connector is typically soldered to a circuit board, which fixedly positions the receptacle connector relative to the circuit board, which is fixedly positioned relative to a mounting surface within a device enclosure. Such fixed positioning of the conventional USB-C receptacle connector makes it difficult to align the receptacle connector with a corresponding opening in the device enclosure, and any resulting misalignments are not desirable. Further, from the outside of the device, the outer metal shell is usually visible through the opening in the device enclosure, which is not desirable in terms of industrial design. Additionally, any new/updated device having an opening within which the USB-C receptacle connector is to be positioned must be designed to meet existing opening-to-receptacle and/or circuit board dimensions, which may require a special or additional design and tooling to precisely position the connector opening, which may incur a large development cost.

Some USB-C receptacle connectors may be provided without an outer metal shell, and may be surface mounted to a flexible printed circuit (FPC). This solution creates problems, however, as removal of the outer metal shell may not be desirable due to the elimination of the EMI shielding that the outer metal shell provides. Further, the use of an FPC for carrying the electrical signals may compromise signal integrity. Additionally, the connection between the receptacle connector and the FPC may require further EMI shielding. Thus, this solution jeopardizes the signal integrity of such a receptacle connector.

In contrast to the prior solutions, the present disclosure provides an electrical receptacle connector that does not have the conventional outer metal shell but is still EMI protected by one or more EMI shielding brackets/pads that cover the signal paths in the electrical receptacle connector. In one non-limiting implementation, a number of coaxial cables are directly soldered to a set of electrical contacts at a back end of the receptacle connector, and at least two EMI shielding brackets/pads provide EMI shielding around the area in which the electrical contacts and the coaxial cables are connected, which provides complete EMI shielding. Further, the shielding layer of the coaxial cables provide additional high-speed signal integrity and EMI shielding outside the bracket area. As such, the EMI shielding brackets/pads directly covering the electrical connection of the contacts of the receptacle connector with the set of coaxial cables provides an integrated connector-cable assembly that is especially suitable for communicating high-speed signals and for properly shielding the high-speed signals for EMI protection. Yet further, since there is no outer metal shell visible through an opening from the outside of a device in which the receptacle connector is mounted, the present electrical receptacle connector provides desirable industrial design. Moreover, removal of a rigidly-soldered, fixed position, outer metal shell may simplify the alignment of the electrical receptacle connector with the corresponding opening in the device enclosure. As such, the present electrical receptacle connector may lower development costs and increase flexibility in the positioning of the opening for accessing the receptacle in the design of a new device. In addition, the removal of the outer metal shell reduces the overall size of the present electrical receptacle connector, and therefore the present electrical receptacle connector may be particularly desirable as device sizes continue to decrease.

In another non-limiting example, the electrical receptacle connector may be specifically configured to meet existing standards for a receptacle connector. For instance, the receptacle connector may include a tongue member having two opposing surfaces, and a number of electrical contacts, such as 12 contacts, on each surface of the tongue member, for example, as defined by USB Implementers Forum (USB IF) for USB-C connectors. Further, as described above, in some implementations the back end of each electrical contact may be directly soldered to one or more coaxial cables that connect(s) the receptacle connector to a circuit board, such as a mother board of a computing device that communicates with a peripheral device through the receptacle connector. In some implementations, the power pins of the receptacle connector may be soldered to more than one coaxial cable at each contact so as to increase the current capacity of the receptacle connector. Optionally, the connection between the contacts of the receptacle connector and the coaxial cables may be protected by an overmold and/or a directly applied glue such as an ultra violet (UV) glue. In some implementations, the receptacle connector may further include one or more EMI shielding brackets/pads covering the electrical contacts on a top and/or bottom of the tongue member. In an implementation, for example, at least one pair of EMI shielding brackets are configured on opposite sides of the tongue member to form a Faraday cage that encloses/surrounds at least a portion of the signal paths in the receptacle connector.

Further, in some implementations, the receptacle connector may also include a mounting member to provide mechanical mounting to a device enclosure. For example, the mounting member may include mounting structures, such as internal walls defining screw holes through which the receptacle connector may be attached to a device enclosure, or other similar types of mounting mechanisms. The mounting member may be, for example, a metal injection-molded member that is assembled to the tongue member. Alternatively, the mounting member may be insert-molded, laser-welded, glued, or otherwise mechanically join the tongue member such that the mounting member is also electrically connected with the EMI shielding brackets. Accordingly, the mounting member not only mechanically mounts the connector to the device enclosure, but also electrically grounds the EMI shields of the connector to the device enclosure. Therefore, when the device enclosure is made of an electrically conductive material, such as an electrically conductive metal, the mounting member creates an electrical path to the device ground (the enclosure), thus improving the EMI shielding of the electrical connector.

Turning now to the figures, examples of the electrical connector assembly, including the receptacle assembly, are depicted with reference to one or more components described herein, where components in dashed lines may be optional. In the following description, FIGS. 1-15 may include similar or related components and are described with reference to each other.

Figure 13:
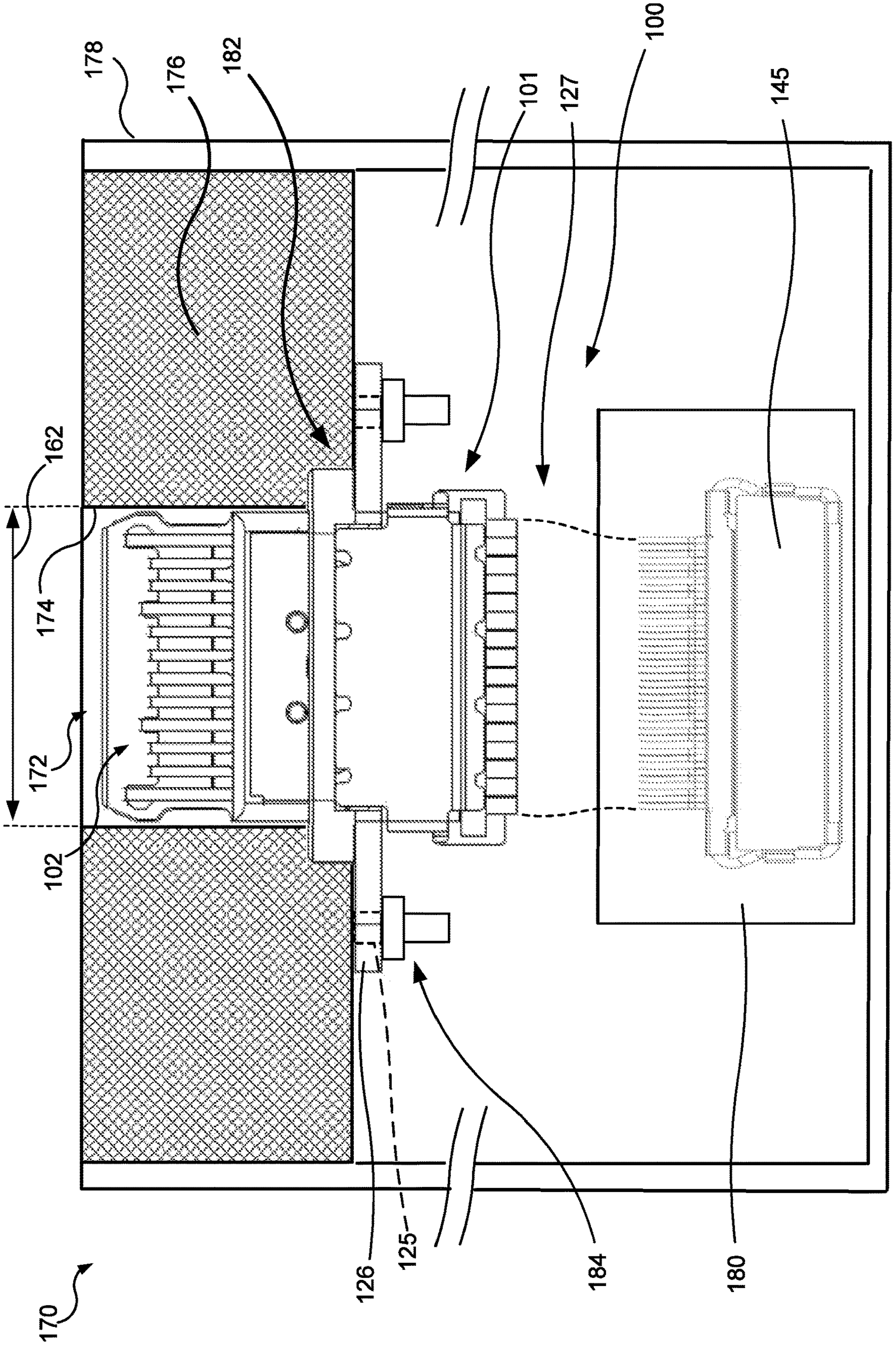
FIG. 13 is a top, partially cross-sectional view of the receptacle connector assembly of the electrical connector assembly of FIG. 1 mounted within a receptacle opening in an enclosure of a device.
Figure 14:
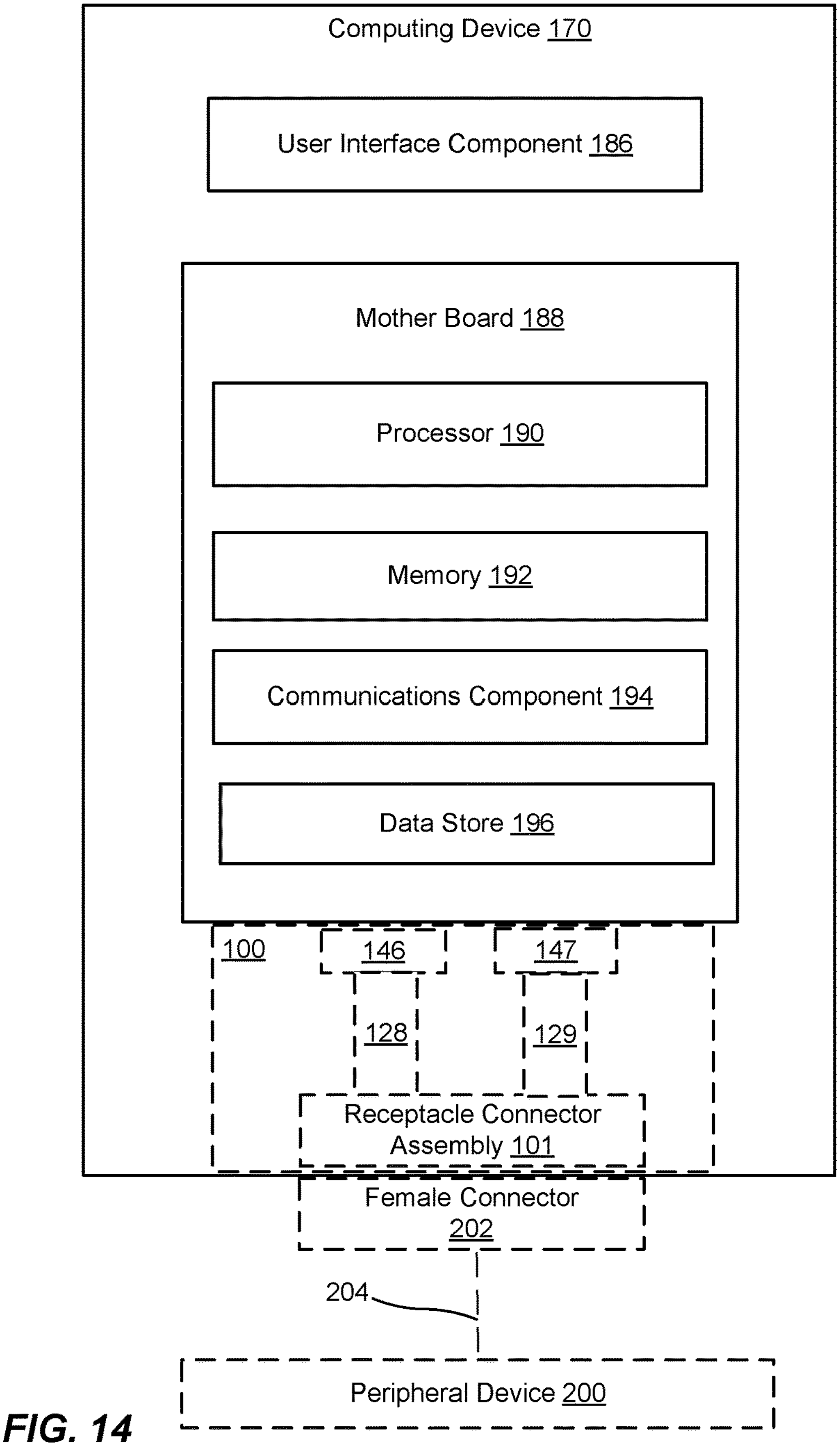
FIG. 14 is a block diagram of an example computing device that implements the example electrical connector assembly of FIG. 1.

Referring to FIG. 1, an electrical connector assembly 100 includes a receptacle connector assembly 101 configured with a shell-less structure that improves an ability to align the receptacle connector assembly 101 with an opening in an enclosure of a device in which the receptacle connector assembly 101 is mounted (see, e.g., FIGS. 13 and 14 for an example of such an enclosure). Further, the receptacle connector assembly 101 configured with a shell-less structure reduces visibility of the receptacle connector assembly 101 from outside the enclosure, as compared to existing receptacle connectors having outer metal shells, thereby improving industrial design. Moreover, the receptacle connector assembly 101 configured with a shell-less structure has an ease of mounting that reduces development costs. In optional implementations, the receptacle connector assembly 101 may be connected to one or more sets of cables 127, e.g., a first set of cables 128 and a second set of cables 129, which may be connected to one or more electrical connectors 145. Thus, in some implementations, the electrical connector assembly 100 may include the combination of the receptacle connector assembly 101, the one or more sets of cables 127, and the one or more electrical connectors 145.

In some implementations, the receptacle connector assembly 101 includes a tongue member 102 having at least a first set of electrical contacts 114 that are protected from EMI at a front end by at least a first EMI shielding bracket 120. In particular, the first EMI shielding bracket 120 may be configured to cover only part of the first set of electrical contacts 114, such as a portion between a shoulder 104 of the tongue member 102 and an exposed portion 103 of the first set of electrical contacts 114 that are uncovered so that they can be electrically connected with a mating connector. The exposed portion 103 of the first set of electrical contacts 114 may be positioned within a receptacle opening 172 (see FIG. 13) defined by one or more internal walls 174 (see FIG. 13) through a side wall 176 of a device enclosure 178 (see FIG. 13), and therefore may also be protected from EMI by the enclosing side wall 176 (see FIG. 13). Although not visible in FIG. 1, the opposite side of the receptacle connector assembly 101 at the front end may be configured similarly.

In some cases, the back end of the electrical contacts of the receptacle connector assembly 101 may be connected to other electrical signal carrying components, and the receptacle connector assembly 101 may include additional EMI protection. For example, the back end of at least the first set of electrical contacts 114 may extend out of a back end of the receptacle connector assembly 101 and may be protected from EMI by at least another EMI shielding bracket 122. In FIG. 1, the back end of the first set of electrical contacts 114 are not visible, as they are covered by the EMI shielding bracket 122. More specifically, in the example of FIG. 1, the back end of at least the first set of electrical contacts 114 are electrically connected to one or more sets of cables 127, such as the first set of cables 128, and the area directly adjacent to this exposed electrical connection may be covered by the EMI shielding bracket 122. Although not wholly visible in FIG. 1, the opposite side of the receptacle connector assembly 101 at the back end may be configured similarly. Thus, in this implementation, due at least to the EMI shielding brackets 120 and 122 positioned immediately adjacent to and covering the exposed sections of the electrical contacts at both the front end and the back end, the receptacle connector assembly 101 forms an integrated receptacle cable that is configured to maintain electrical signal integrity.

Additionally, in some implementations, the receptacle connector assembly 101 may include one or more features to enable easy positioning of the tongue member 102 relative to an opening in an enclosure of a device, and flexible mounting within the device. For instance, the shoulder 104 may extend from the surfaces of the tongue member 102 by a configurable distance in one or more directions in order to guide placement of the receptacle connector assembly 101 against one or more walls of an enclosure of a device. This shape or form of the shoulder 104 enables precise location of the tongue member 102 relative to an opening defined in the enclosure. In some cases, such as when configured to meet certain standards or specifications, such as a USB-C type standard, the shoulder 104 may have a cross-sectional area within a receptacle opening size limit.

Alternatively, or in addition, the receptacle connector assembly 101 may further include a mounting member 126 designed to assist in locating the receptacle connector assembly 101 and/or the tongue member 102 relative to an opening defined in the enclosure in which the receptacle connector assembly 101 is mounted. The mounting member 126 may be connected to, and extend in one or more directions from, a body of the receptacle connector assembly 101 and/or the shoulder 104. The mounting member 126 may be sized to extend an amount that allows the mounting member 126, and hence the receptacle connector assembly 101, to be easily mounted to a wall of an enclosure. Moreover, the mounting member 126 may have one or more mounting features 125 that enable precise positioning of the receptacle connector assembly 101 and/or the tongue member 102 relative to an opening defined in an enclosure to which the mounting member 126 is attached. For instance, the one or more mounting features 125 may include, but are not limited to, internal walls defining through-holes for receiving a screw or bolt to which a nut or other securing mechanism may be affixed to secure the mounting member 126 to the enclosure. Further, the mounting member 126 may be configured to electrically connect at least one of the EMI shielding brackets 120, 121, 122, 123 to the device enclosure 178 (see FIG. 13) in order to improve EMI protection of the receptacle connector assembly 101.

The above features and additional features of the electrical connector assembly 100 and the receptacle connector assembly 101 will now be described in more detail.

Continuing to refer to FIG. 1 and additionally referring to FIGS. 2-6 (where all of the referenced features are visible in FIG. 2, and FIGS. 1 and 3-6 providing supplementary views of select features), further details of the receptacle connector assembly 101 will now be described in more detail. The tongue member 102 includes a body extending between a first tongue end 110 and a second tongue end 112. The shoulder 104 extends from at least a first tongue surface 106 at the second tongue end 112. The shoulder 104 may further extend from a second tongue surface 108 at the second tongue end 112, where the second tongue surface 108 is opposite the first tongue surface 106.

In either case, the shoulder 104 may be sized to have a cross-sectional area within a receptacle opening size limit. For example, in a case where the first tongue surface 106 and the second tongue surface 108 are orthogonal to a Y axis, the receptacle connector assembly 101 may be a USB-C receptacle connector assembly for which a receptacle opening height size limit 160 (see FIG. 6) may be 2.56 mm, e.g., a height along the Y axis, and a receptacle opening width size limit 162 (see FIG. 3) may be 8.34 mm, e.g., along the X axis, in order to comply with USB IF for USB-C receptacles. Accordingly, in this case, a height of the shoulder 104 along the Y axis may be substantially equal to or less than 2.56 mm, and a width of the shoulder 104 along the X axis may be substantially equal to or less than 8.34 mm.

As mentioned, the receptacle connector assembly 101 further includes at least the first set of electrical contacts 114 for making an electrical connection with other devices, cables, or circuits. The first set of electrical contacts 114 may be attached to the first tongue surface 106 such that: (1) a first contact end 116 of the first set of electrical contacts 114 is attached at the first tongue end 110, and (2) a second contact end 118 of the first set of electrical contacts 114 extends through the shoulder 104 and beyond the second tongue end 112, e.g., beyond a back side of the shoulder 104. The receptacle connector assembly 101 may further include a second set of electrical contacts 115 for making an electrical connection with other devices, cables, or circuits. The second set of electrical contacts 115 may be attachable to the second tongue surface 108 such that: (1) a third contact end 117 of the second set of electrical contacts 115 is attached at the first tongue end 110, and (2) a fourth contact end 119 of the second set of electrical contacts 115 extends through the shoulder 104 and beyond the second tongue end 112, e.g., beyond a back side of the shoulder 104. The extension of the first and second set of electrical contacts 114 and 115 beyond the second tongue end 112 provides an exposed section of the first and second set of electrical contacts 114 and 115 that can be connected to other devices, cables, or circuits.

When the first and second set of electrical contacts 114 and 115 are respectively attached to the first and second tongue surfaces 106 and 108, the first contact end 116 may be positioned to be aligned with the third contact end 117, and the second contact end 118 may be positioned to be aligned with the fourth contact end 119.

In order to provide EMI shielding of electrical signal paths, the receptacle connector assembly 101 may further include at least the first EMI shielding bracket 120 configured to cover at least a first portion 138 of the first set of electrical contacts 114. In this case, the first portion 138 is positionable between the first tongue end 110 and the shoulder 104 of the tongue member 102. The receptacle connector assembly 101 may further include a second EMI shielding bracket 121 configured to cover a second portion 139 of the second set of electrical contacts 115. In this case, the second portion 139 is positionable between the first tongue end 110 and the shoulder 104 of the tongue member 102. In an implementation, and more particularly, the first portion 138 of the first set of electrical contacts 114 and the second portion 139 of the second set of electrical contacts 115 extend between the exposed portion 103 (see FIG. 1) of the respective contacts and the shoulder 104. Accordingly, the first EMI shielding bracket 120 and the second EMI shielding bracket 121 may form an EMI shielding Faraday cage 168 (see, e.g., FIGS. 9-12) that encloses at least the first portion 138 of the first set of electrical contacts 114 and the second portion 139 of the second set of electrical contacts 115.

The receptacle connector assembly 101 may further include a center plate 124 positionable within the tongue member 102, and between the first set of electrical contacts 114 and the second set of electrical contacts 115, to which the EMI shielding brackets 120, 121 may be mounted and/or electrically connected. For example, the center plate 124 may be mounted such that a first center plate surface 142 faces the first set of electrical contacts 114 and a second center plate surface 144, which is opposite the first center plate surface 142, faces the second set of electrical contacts 115. As noted, the first EMI shielding bracket 120 and/or the second EMI shielding bracket 121 may be electrically connected to the center plate 124. For example, the first EMI shielding bracket 120 and/or the second EMI shielding bracket 121 may be welded or soldered to the center plate 124 to provide an electrical ground to help form the Faraday cage 168. The center plate 124 may be formed from a metal or an electrically conductive material.

The receptacle connector assembly 101 may further include a third EMI shielding bracket 122 configured to cover at least a third portion 140 of the first set of electrical contacts 114. In this case, the third portion 140 is positioned between the shoulder 104 of the tongue member 102 and the second contact end 118 when the first set of electrical contacts 114 is attached to the first tongue surface 106. The receptacle connector assembly 101 may also include a fourth EMI shielding bracket 123 configured to cover a fourth portion 141 of the second set of electrical contacts 115, where the fourth portion 141 is positioned between the shoulder 104 of the tongue member 102 and the fourth contact end 119 when the second set of electrical contacts 115 is attached to the second tongue surface 108. Accordingly, the third EMI shielding bracket 122 and the fourth EMI shielding bracket 123 may further form the EMI shielding Faraday cage 168 (see, e.g., FIGS. 9-12) that encloses the sections of the first and second set of electrical contacts 114 and 115 that are exposed and that extend out of the back end of the receptacle connector assembly 101, e.g., the third and fourth portions 140 and 141. This provides electrical signal integrity, for example, for any connectors, cables, or circuits connected to these sections of the contacts.

In implementations where the receptacle connector assembly 101 includes all of the first, second, third, and fourth EMI shielding bracket 120, 121, 122, and 123, the EMI shielding Faraday cage 168 (see, e.g., FIGS. 9-12) is formed by all the EMI shielding brackets. Further, in this case, the EMI shielding Faraday cage 168 (see, e.g., FIGS. 9-12) encloses and shields at least the first portion 138 and the third portion 140 of the first set of electrical contacts 114, as well as the second portion 139 and the fourth portion 141 of the second set of electrical contacts 115.

Additionally, as mentioned above, the electrical connector assembly 100 may further include one or more sets of cables 127. For example, the first set of cables 128 includes a first cable end 154 and a second cable end 156, where the first cable end 154 of each cable is electrically connected to a respective one of the first set of electrical contacts 114 at the second contact end 118. The electrical connector assembly 100 may further include the second set of cables 129 having a third cable end 155 and a fourth cable end 157, where the third cable end 155 of each cable is electrically connected to a respective one of the second set of electrical contacts 115 at the fourth contact end 119. In these implementations, the EMI shielding Faraday cage 168 (see, e.g., FIGS. 9-12) encloses and shields the location of the electrical connections between the first set of cables 128 and the first set of electrical contacts 114 and the location of the electrical connections between the second set of cables 129 and the second set of electrical contacts 115.

Additionally, the receptacle connector assembly 101 may further include a first ground bar 130 extending across and electrically connected to the first set of cables 128 at the second contact end 118 to electrically ground the cables. The receptacle connector assembly 101 may also include a second ground bar 131 extending across and electrically connected to the second set of cables 128 at the fourth contact end 119 to electrically ground the cables.

In an implementation, the first set of cables 128 may be coaxial cables that each are electrically connected to a respective one of the first set of electrical contacts 114. Similarly, the second set of cables 129 may be coaxial cables that each are electrically connected to a respective one of the second set of electrical contacts 115. For example, the first set of cables 128 may be coaxial cables that each are directly soldered to a respective one of the first set of electrical contacts 114. Similarly, the second set of cables 129 may be coaxial cables that each are directly soldered to a respective one of the second set of electrical contacts 115.

In an implementation, the first set of cables 128 may be coaxial cables that each have at least three layers including a first conductive core 152 that is covered by a first insulator 150 that is covered by a first ground layer 148. Similarly, the second set of cables 129 may be coaxial cables that each have at least three layers including a second conductive core 153 that is covered by a second insulator 151 that is covered by a second ground layer 149. Each one of the first ground layer 148 or the second ground layer 149 may be, for example, a grounding braid, a ground jacket, or any other electrically conductive material layer suitable for shielding the signal carried by the cables from EMI. In these implementations, the first ground bar 130 is electrically connected to each first ground layer 148 to electrically ground the corresponding cables, and the second ground bar 131 is electrically connected to each second ground layer 149 to electrically ground the corresponding cables. For example, the first ground bar 130 may be directly soldered to each first ground layer 148, and the second ground bar 131 may be directly soldered to each second ground layer 149. Further, the third EMI shielding bracket 122 may be electrically connected to the first ground bar 130, and the fourth EMI shielding bracket 123 may be electrically connected to the second ground bar 131 to electrically ground these components.

In an implementation, the receptacle connector assembly 101 may further include a first bottom ground bar 134 extending across and under the first set of cables 128 and electrically connected (e.g., soldered) the first ground layer 148 to the center plate 124. The receptacle connector assembly 101 may further include a second bottom ground bar 135 extending across and under the second set of cables 128 and electrically connected (e.g., soldered) the second ground layer 149 to the center plate 124.

In an implementation, the receptacle connector assembly 101 may further include one or more protective layers to provide additional protection to the cables or contact areas within the assembly. For instance, the receptacle connector assembly 101 may include a first protective layer 132 extending across and protecting the first set of cables 128 at the second contact end 118, as well as a second protective layer 133 extending across and protecting the second set of cables 128 at the second contact end 118. Further, the receptacle connector assembly 101 may further include a third protective layer 136 extending across and protecting the first set of cables 128 between the shoulder 104 and the second contact end 118, as well as a fourth protective layer 137 extending across and protecting the second set of cables 128 between the shoulder 104 and the second contact end 118. Each protective layer 132, 133, 136, and 137 may be an overmold formed from a material that may be molded onto a partially assembled form of the receptacle connector assembly 101, for example, using low pressure molding or thermoplastic. Suitable example of such a material include polymers, plastic, or other similar types of materials. Alternatively, each protective layer 132, 133, 136, and 137 may be formed from a material that may be directly applied onto a partially assembled form of the receptacle connector assembly 101. Suitable example of such a material include glues including UV glue, or other similar types of materials.

In an implementation, the electrical connector assembly 100 further includes one or more coaxial connectors 145, such as a first coaxial connector 146 electrically connected to the second cable end 156 of the first set of cables 128. The electrical connector assembly 100 may further include a second coaxial connector 147 electrically connected to the fourth cable end 157 of the second set of cables 129. In some cases, the first coaxial connector 146 and the second coaxial connector 147 may be combined into a same coaxial connector 145 connected to both the first set of cables 128 and the second set of cables 129. For example, the first coaxial connector 146 and the second coaxial connector 147 connect a respective one of the first set of cables 128 and the second set of cables 129 to a circuit board, such as but not limited to a circuit board 180 (see FIG. 13) and/or a mother board 188 (see FIG. 14) of a device 170.

In certain implementations, the receptacle connector assembly 101 may have the mounting member 126 abutting and/or surrounding the shoulder 104 and configured for mechanically mounting the receptacle connector assembly 101 to a wall 176 (see FIG. 13) of a device enclosure 178 (see FIG. 13). For example, the mounting member 126 may be a metal injection molded component assembled onto the shoulder 104 of the tongue member 102. Alternatively, the mounting member 126 may be insert-molded, laser-welded, glued, or otherwise mechanically join the tongue member 102 such that the mounting member 126 is also electrically connected with the EMI shielding brackets 120, 121, 122, 123. Accordingly, the mounting member 126 not only mechanically mounts the electrical connector assembly 100 to the device enclosure 178 (see FIG. 13), but also electrically grounds the EMI shielding brackets 120, 121, 122, 123 to the device enclosure 178 (see FIG. 13). Therefore, when the device enclosure 178 (see FIG. 13) is made of an electrically conductive material, such as an electrically conductive metal, the mounting member 126 creates an electrical path to the device ground (the device enclosure 178 (see FIG. 13)), thus improving the EMI shielding of the electrical connector assembly 100.

Figure 8:
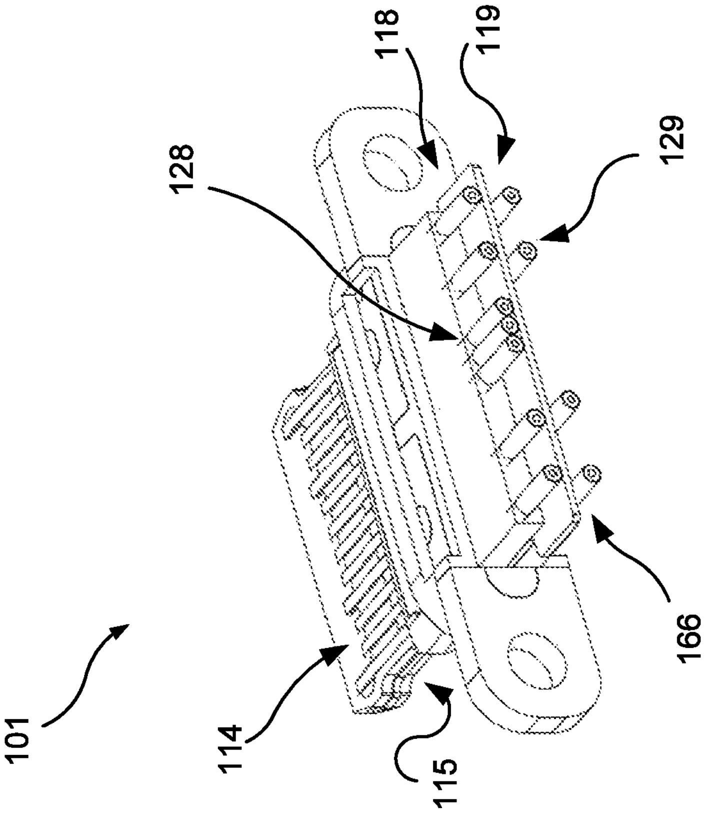
FIG. 8 is a back perspective view of the receptacle connector assembly of the electrical connector assembly of FIG. 1 having cables connected for a less than a full data configuration, such as a power and Universal Serial Bus (USB) 2.0 only configuration.
Figure 7:
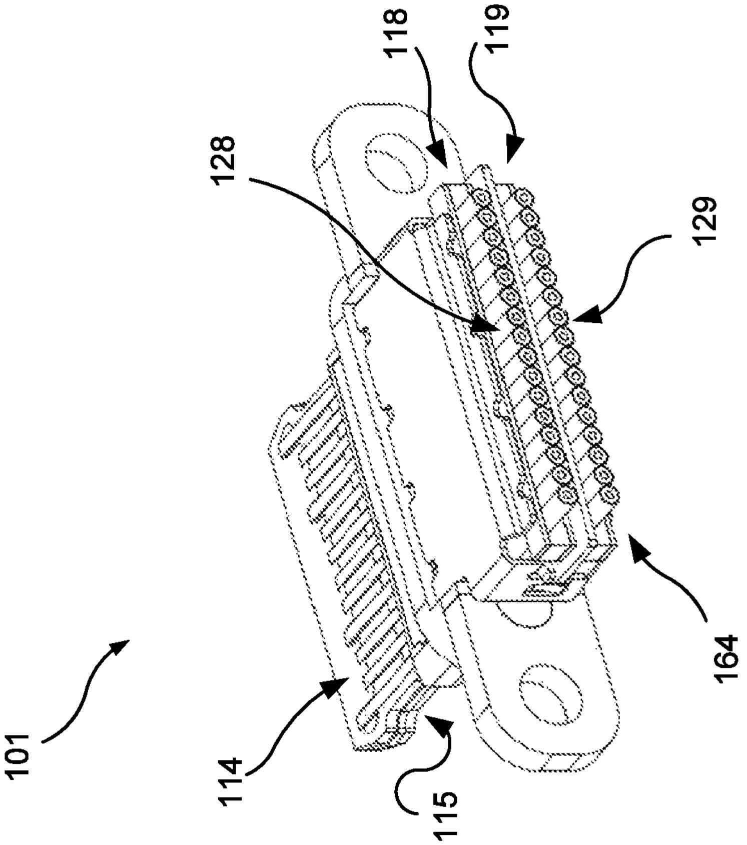
FIG. 7 is a back perspective view of the receptacle connector assembly of the electrical connector assembly of FIG. 1 having cables connected for a full data configuration.
Figure 10:
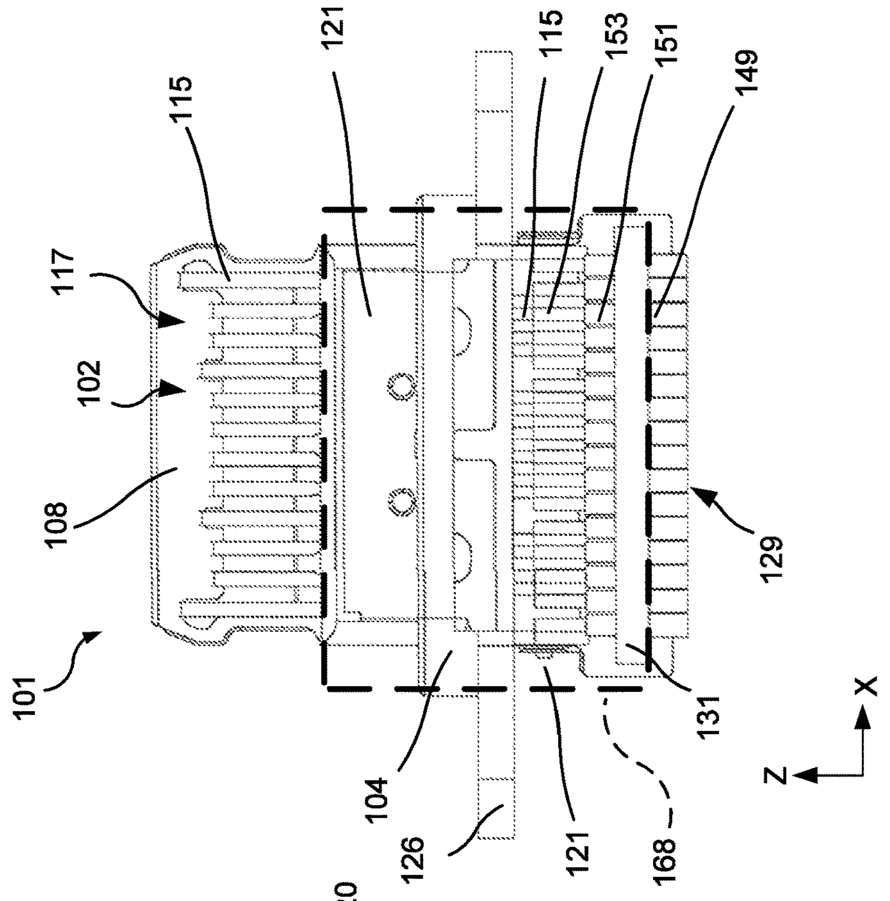
FIG. 10 is a bottom view of the receptacle connector assembly of the electrical connector assembly of FIG. 1, including a representation of a part of the Faraday cage formed by the one or more EMI shielding brackets.
Figure 9:
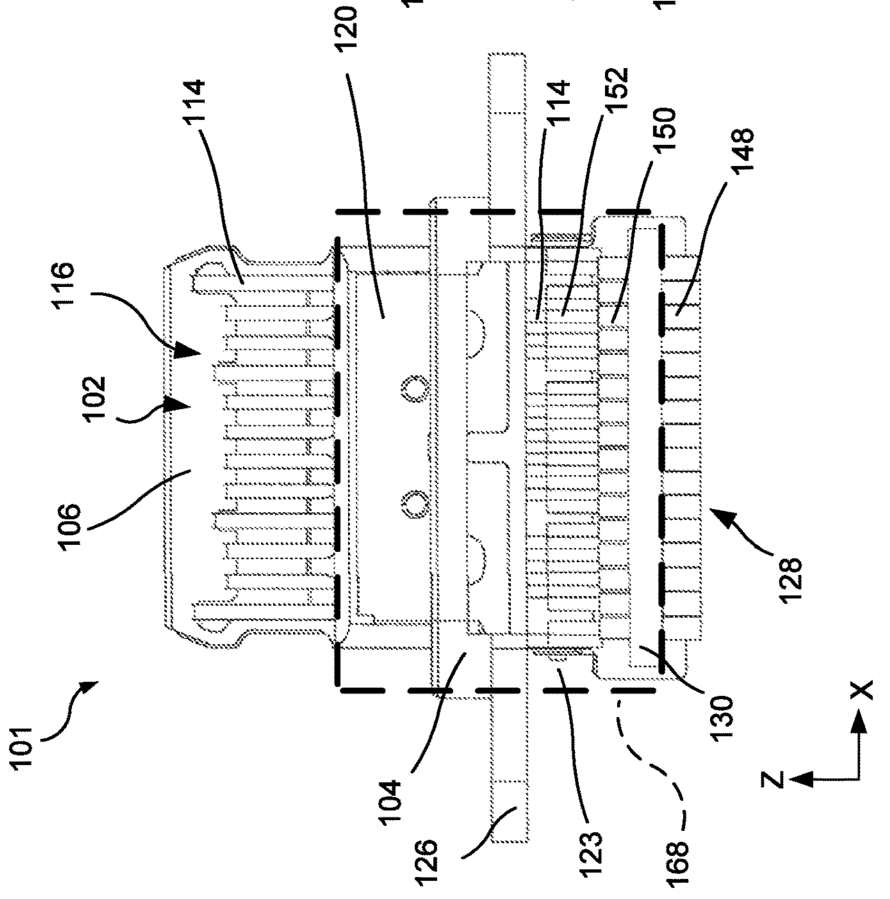
FIG. 9 is a top view of the receptacle connector assembly of the electrical connector assembly of FIG. 1, including a representation of a part of a Faraday cage formed by one or more electromagnetic interference (EMI) shielding brackets.

Referring to FIGS. 7 and 8, the first and second sets of electrical contacts 114 and 115 may be configured to accommodate different combinations of cable connections at the back end of the receptacle connector assembly 101, e.g., at the second and fourth contact ends 118 and 119. For example, in FIG. 7, the configuration 164 of the first and second set of cables 128 and 129 may be designed for a full-data configuration of a USB-C type connector. In contrast, for example, in FIG. 8, the configuration 166 of the first and second set of cables 128 and 129 may be designed for a power and USB 2.0 only configuration of a USB-C type connector.

Referring to FIGS. 9-12, the EMI shielding brackets 120, 121, 122, and 123 are configured to form the Faraday cage 168 around the otherwise exposed areas of the first and second sets of contacts 114 and 115 of the receptacle connector assembly 101. In particular, due to the shell-less design of the receptacle connector assembly 101, without the EMI shielding brackets, in some implementations only the mounting member 126 may be formed from a metal or an electrically conductive material, and thus may help to protect the signals carries by the contacts from EMI. For instance, the tongue member 102 may be formed of a plastic, ceramic, or other non-metal or non-electrically conductive material.

Accordingly, the present solution includes the addition of one or more EMI shielding brackets, e.g., extending over at least part of the front side (e.g., over part of contact end 116 and/or 117) and/or over at least part of the back side (e.g., over part or all of contact end 118 and/or 119) of the receptacle connector assembly 101. Specifically, the EMI shielding brackets 120, 121, 122, and 123 are formed from a metal or an electrically conductive material, and are mounted within the dimensions of the receptacle opening area limit (e.g., the receptacle opening height size limit 160 (see FIG. 6) and the receptacle opening width size limit 162 (see FIG. 3)). In some implementations, the EMI shielding brackets 120, 121, 122, and 123 are located very close to the first and second sets of contacts 114 and 115 to minimize their spacing from the surface of the contacts, and to minimize the height (in the Y axis) of the receptacle connector assembly 101. For example, the outer surface of the EMI shielding brackets 120, 121, 122, and 123 may be within the extent of the shoulder 104 and/or the mounting member 126, e.g., in one or both of the Y axis and the X axis. The EMI shielding brackets 120, 121, 122, and 123 may be grounded, e.g., to the center plate 124. The Faraday cage 168 formed by the EMI shielding brackets 120, 121, 122, and 123 provides the receptacle connector assembly 101 with the ability to maintain signal integrity over otherwise exposed areas of the first and second sets of contacts 114 and 115.

Figure 11:
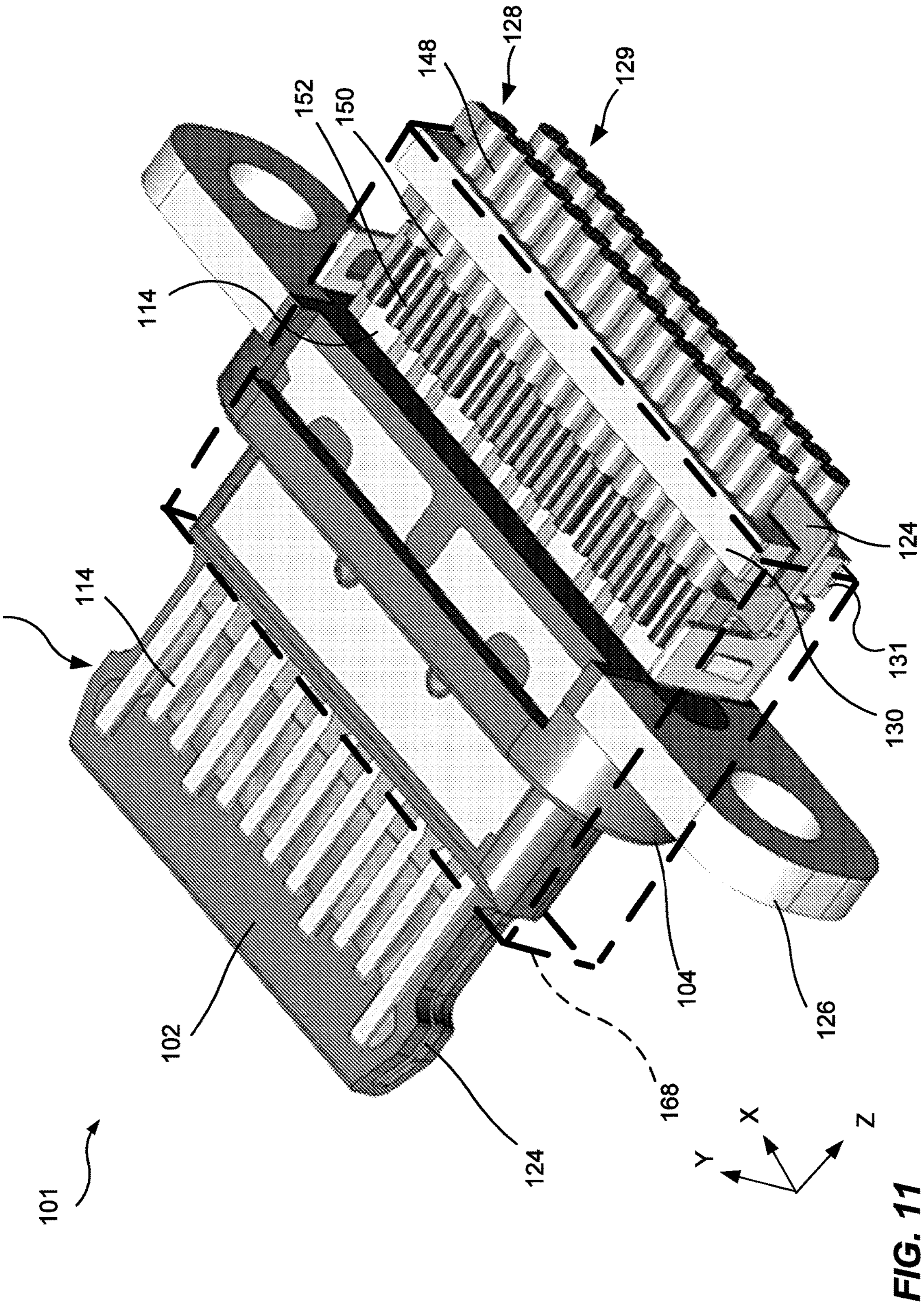
FIG. 11 is a top, partially open perspective view of the receptacle connector assembly of FIG. 1 with the back, top EMI shielding bracket removed, and including a representation of a part of the Faraday cage formed by the one or more EMI shielding brackets.
Figure 12:
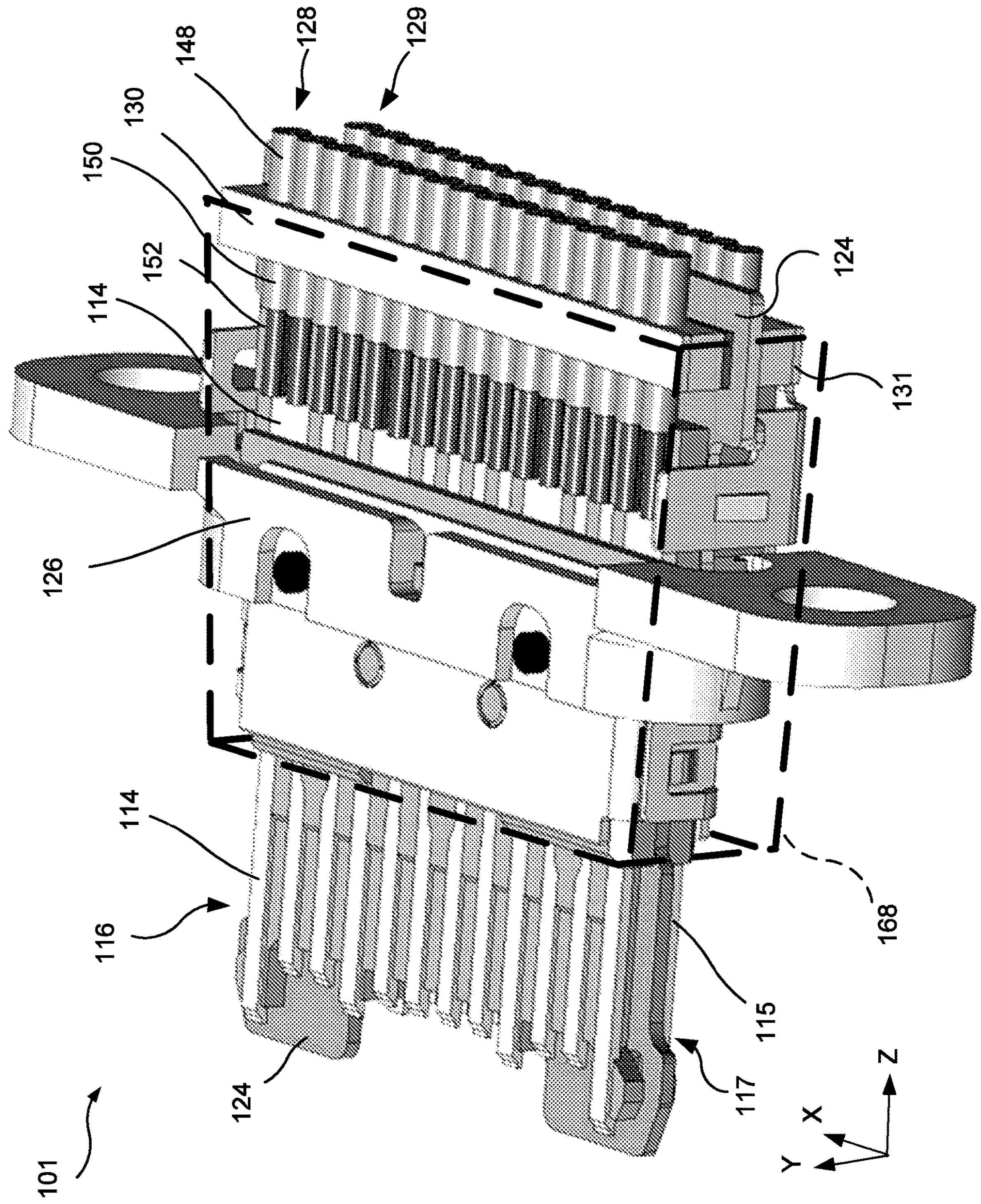
FIG. 12 is a top, partially open and partially de-constructed perspective view of the receptacle connector assembly of the electrical connector assembly of FIG. 1, and similar to FIG. 11, but with non-metal or non-electrically conductive parts removed, with the back, top EMI shielding bracket removed, and including a representation of a part of the Faraday cage formed by the one or more EMI brackets.

Additionally, specifically referring to FIGS. 11 and 12, the electrically-conductive contact areas within the receptacle connector assembly 101 are highlighted by comparing the structures in these two figures. For example, FIG. 11 includes the tongue member 102, including the shoulder 104, which is formed of a plastic, ceramic, or other non-electrically conductive material that may assembled around and/or integrally molded with the metal or electrically-conductive components. In contrast, FIG. 12 includes only the metal or electrically-conductive components, e.g., with the tongue member 102 removed. For example, the metal or electrically-conductive components may include, but are not limited to, the center plate 124, the first and second sets of contacts 114 and 115, the mounting member 126, the ground bars 130 and 131, the conductive core 152 (and 153) and the ground layer 148 (and 149) of the set of cables 128 (and 129), and the EMI shielding brackets 120, 121, 122, and 123.

In some implementations, the apparatus of the present disclosure may be in the form of a kit of parts that can be assembled to form the apparatus. For instance, in an implementation an electrical connector kit includes a receptacle connector kit, where the receptacle connector kit includes a tongue member having a body with a first tongue surface extending between a first tongue end and a second tongue end and having a shoulder extending from the first tongue surface adjacent to the second tongue end, where the shoulder has a cross-sectional area within a receptacle opening size limit. The receptacle connector kit further includes a first set of electrical contacts each extendable through the shoulder of the tongue member between a first contact end and a second contact end that are on opposite sides of the shoulder, where the first set of electrical contacts at the first contact end are attachable to the first tongue surface at the first tongue end, and the first set of electrical contacts at the second contact end are extendable beyond the second tongue end. The receptacle connector kit further includes a first EMI shielding bracket configured to cover at least a first portion of the first set of electrical contacts positionable between the first contact end and the shoulder of the tongue member.

In an implementation, the body of the tongue member may have a second surface opposite the first surface and extending between the first tongue end and the second tongue end, and the shoulder may further extend from the second surface adjacent to the second tongue end.

In an implementation, the receptacle connector kit may further include a second set of electrical contacts each extendable through the shoulder of the tongue member between a third contact end and a fourth contact end, where the second set of electrical contacts at the third contact end are attachable to the second tongue surface at the first tongue end, and the second set of electrical contacts at the fourth contact end are extendable beyond the second tongue end.

In an implementation, the receptacle connector kit may further include a second EMI shielding bracket configured to cover at least a first portion of the second set of electrical contacts positionable between the first contact end and the shoulder of the tongue member.

In an implementation, the receptacle connector kit may further include a third EMI shielding bracket configured to cover at least a second portion of the first set of electrical contacts positionable between the shoulder of the tongue member and the second contact end. In an implementation, the receptacle connector kit may further include a fourth EMI shielding bracket configured to cover at least a second portion of the second set of electrical contacts positionable between the shoulder of the tongue member and the second contact end.

In an implementation, the electrical connector kit may further include a first set of cables each electrically connectable to a respective one of the first set of electrical contacts at the second contact end. In an implementation, the electrical connector kit may further include a second set of cables each electrically connectable to a respective one of the second set of electrical contacts at the second contact end.

In an implementation, the receptacle connector kit may further include a first ground bar extendable across and electrically connectable to the first set of cables at the second contact end. In an implementation, the receptacle connector kit may further include a second ground bar extendable across and electrically connectable to the second set of cables at the second contact end.

In an implementation, the receptacle connector kit may further include a mounting member configured to surround the shoulder and configured for mechanically mounting the electrical connector assembly to a wall of a device enclosure.

Thus, the present implementations provide an electrical receptacle assembly, such as a USB-C receptacle assembly, that does not include the conventional metal shell and is therefore easy to align with a device enclosure opening. Further, the shell-less electrical receptacle assembly requires less space inside the device as compared to conventional receptacle assemblies that include a metal shell. Additionally, there is no metal shell visible through the receptacle opening from the outside of the device. The shell-less electrical receptacle assembly is shielded for EMI protection and may be integrated with high-speed coaxial cables by directly soldering the electrical contacts of the electrical receptacle assembly with respective coaxial cables. Accordingly, a more cost-effective, space-effective, and industrially desirable EMI-shielded electrical receptacle assembly is provided.

Referring to FIG. 13, in one example application, the electrical connector assembly 100 may be mounted within a device 170 such that the tongue member 102 of the receptacle connector assembly 101 is easily and precisely positioned within a receptacle opening 172 defined by one or more internal walls 174 through a side wall 176 of an enclosure or housing (e.g., the device enclosure 178) of the device 170. For example, the device 170 may be any type of computer device, which may include a circuit board 180 to which the coaxial cable connector 145 of the electrical connector assembly 100 may be connected. The device 170 may include any variety of other components typical of an electronic or computerized device, such as but not limited to a processor, a memory, and one or more user interfaces (e.g., a display, an mouse, a keyboard).

In an implementation, the internal wall 174 through the side wall 176 of the enclosure 178 may include one or more additional walls or other mounting features 182 adjacent to the shoulder 104 and/or the mounting member 126 that cooperate with the shoulder 104 and/or the mounting member 126 to position the tongue member 102 within the receptacle opening 172. For instance, the additional walls or other mounting features 182 may include one or more walls or supports against which the shoulder 104 and/or the mounting member 126 may be placed to accurately locate the tongue member 102 within the receptacle opening 172.

In other alternative or additional implementations, the enclosure 178 may further include one or more connector members 184 to releasably or permanently fix the receptacle connector assembly 101 to the side wall 176 and/or to assist with positioning the tongue member 102 within the receptacle opening 172. For instance, the one or more connector members 184 may include, but are not limited to, posts or screw bodies extending from the side wall 176, perpendicular to the opening 172, and corresponding screws, which cooperate with the mounting features 125, e.g., through holes, of the mounting member 126. For instance, the one or more connector members 184 and the mounting features 125 may be dimensioned relative to the opening 172 and the receptacle connector assembly 101 to position the tongue member 102 in a desired position relative to the opening 172. In other cases, as mentioned above, the one or more connector members 184 and the mounting features 125 may be dimensioned to allow relative positioning movement, e.g., before affixing, to allow the interaction between the shoulder 104 and/or the mounting member 126 and the one or more additional walls or other mounting features 182 to control the positioning of the tongue member 102 within the opening 172.

Referring to FIG. 14, in another example application, the electrical connector assembly 100 may be mounted within an example of the device 170, such as a computing device that includes a circuit board such as a mother board 188, where the electrical connector assembly 100 electrically connects at least one electrical circuit in the mother board 188 with at least one electrical circuit in a peripheral device 200, such as a mouse, a keyboard, a display, a printer, another computer device, etc. In an implementation, the receptacle connector assembly 101 of the electrical connector assembly 100 may be sized and/or otherwise configured to engage a female connector 202, such as a female USB-C connector, so as to electrically connect the mother board 188 to the peripheral device 200, for example, via a USB cable 204. It should be understood that this is a non-limiting example, and that the electrical connector assembly 100 may be used to connect two electrical components of any type. In an implementation, for example, the one or more EMI shielding brackets described herein may prevent EMI interference to signal paths in the electrical connector assembly 100 and/or at least in the receptacle connector assembly 101.

In an example, the mother board 188 includes a processor 190, and the processor 190 may include a single or multiple set of processors or multi-core processors. Moreover, the processor 190 may be implemented as an integrated processing system and/or a distributed processing system. The mother board 188 may further include memory 192, such as for storing local versions of applications being executed by the processor 190, related instructions, parameters, etc. The memory 192 may include a type of memory usable by a computer, such as random access memory (RAM), read only memory (ROM), tapes, magnetic discs, optical discs, volatile memory, non-volatile memory, and any combination thereof. Additionally, the processor 190 and the memory 192 may include and execute an operating system executing on the processor 190, one or more applications, display drivers, etc., and/or other components of the computing device 170.

Further, the mother board 188 may include a communications component 194 that provides for establishing and maintaining communications with one or more other devices, parties, entities, etc. utilizing hardware, software, and services. The communications component 194 may carry communications between components on the computing device 170, as well as between the computing device 170 and external devices, such as devices located across a communications network and/or devices serially or locally connected to the computing device 170. For example, the communications component 194 may include one or more buses, and may further include transmit chain components and receive chain components associated with a wireless or wired transmitter and receiver, respectively, operable for interfacing with external devices.

Additionally, the mother board 188 may include a data store 196, which can be any suitable combination of hardware and/or software, that provides for mass storage of information, databases, and programs. For example, a data store 196 may be or may include a data repository for applications and/or related parameters not currently being executed by processor 190. In addition, the data store 196 may be a data repository for an operating system, application, display driver, etc., executing on the processor 190, and/or one or more other components of the computing device 170.

The computing device 170 may also include a user interface component 186 operable to receive inputs from a user of the computing device 170 and further operable to generate outputs for presentation to the user (e.g., via a display interface to a display device). The user interface component 186 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 186 may include one or more output devices, including but not limited to a display interface, a speaker, a haptic feedback mechanism, a printer, any other mechanism capable of presenting an output to a user, or any combination thereof.

Figure 15:
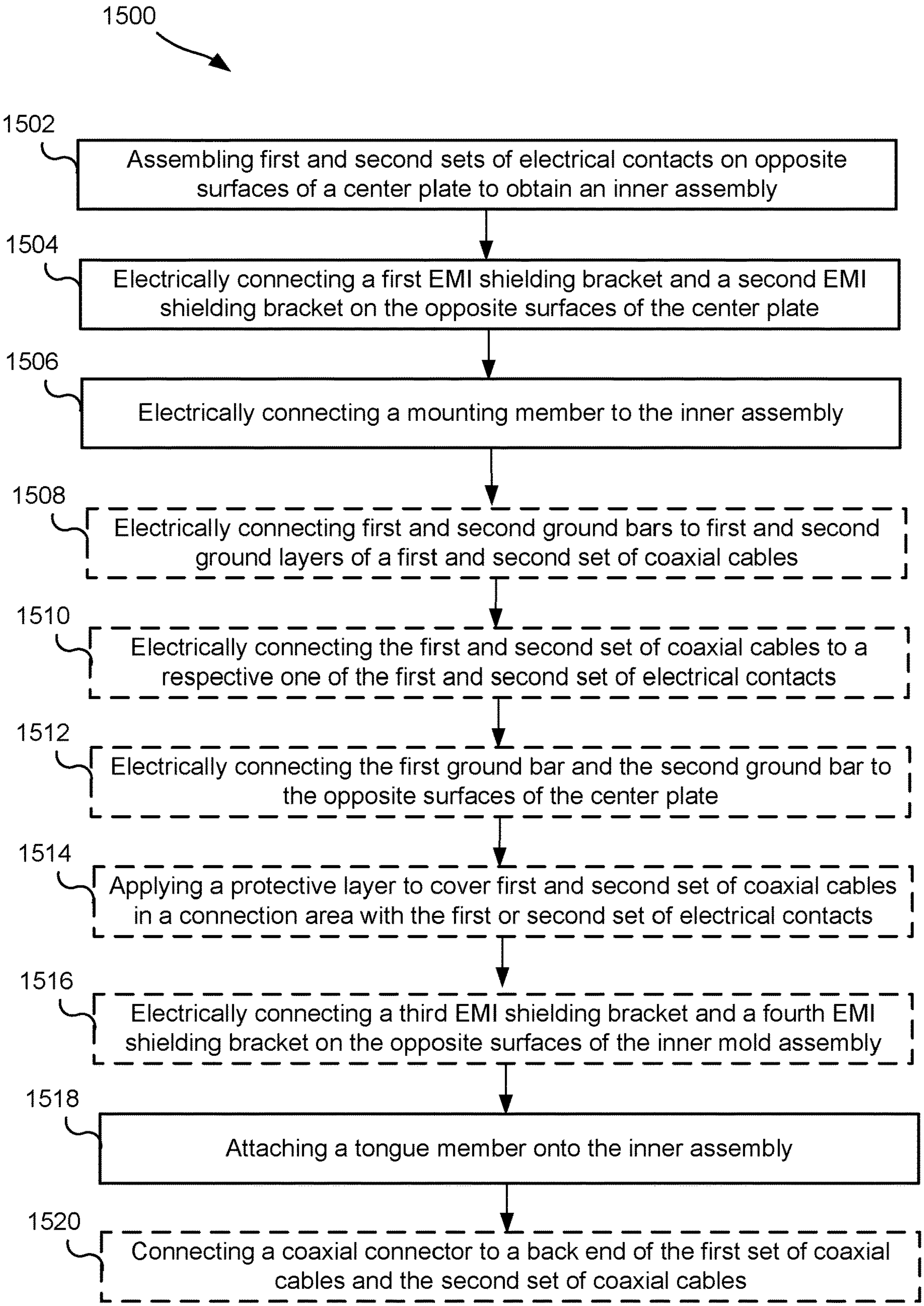
FIG. 15 is a flowchart of an example method of making an electrical connector assembly and/or receptacle connector assembly.

Referring to FIG. 15, in one example, a method 1500 of making an electrical connector assembly, such as the electrical connector assembly 100 and/or the receptacle connector assembly 101, may include, at block 1502, assembling a first set of electrical contacts and a second set of electrical contacts on opposite surfaces of a center plate to obtain an inner assembly. For example, the first set of electrical contacts 114 and the second set of electrical contacts 115 may be assembled on opposite surfaces of the center plate 124 to obtain an inner assembly.

At block 1504 the method 1500 may further include first electrically connecting, subsequent to the assembling, a first EMI shielding bracket and a second EMI shielding bracket on the opposite surfaces of the center plate, where the first EMI shielding bracket covers at least a first portion of the first set of electrical contacts, and the second EMI shielding bracket covers at least a first portion of the second set of electrical contacts. For example, subsequent to block 1502, the first EMI shielding bracket 120 and the second EMI shielding bracket 121 may be electrically connected (e.g., laser-welded) on the opposite surfaces of the center plate 124 such that the first EMI shielding bracket 120 covers at least the first portion 138 of the first set of electrical contacts 114 and the second EMI shielding bracket 121 covers at least the second portion 139 of the second set of electrical contacts 115.

At block 1506 the method 1500 may further include second electrically connecting, subsequent to the first electrically connecting, a mounting member to the inner assembly. For example, subsequent to block 1504, the mounting member 126 may be electrically connected to the inner assembly.

Optionally, at block 1508 the method 1500 may further include third electrically connecting a first ground bar across a first set of coaxial cables to a first ground layer of the first set of coaxial cables and a second ground bar across a second set of coaxial cables to a second ground layer of the second set of coaxial cables. For example, optionally after block 1506, the first ground bar 130 may be electrically connected (e.g., soldered) across the first set of coaxial cables 128 to the first ground layer 148 of the first set of coaxial cables 128, and the second ground bar 131 may be electrically connected (e.g., soldered) across the second set of coaxial cables 129 to the second ground layer 149 of the second set of coaxial cables 129.

Optionally, at block 1510 the method 1500 may further include fourth electrically connecting, subsequent to the third electrically connecting, each coaxial cable of the first set of coaxial cables to a respective one of the first set of electrical contacts and each coaxial cable of the second set of coaxial cables to a respective one of the second set of electrical contacts. For example, optionally after block 1508, each coaxial cable of the first set of coaxial cables 128 may be electrically connected (e.g., directly soldered) to a respective one of the first set of electrical contacts 114, and each coaxial cable of the second set of coaxial cables 129 may be electrically connected (e.g., directly soldered) to a respective one of the second set of electrical contacts 114 or 115.

Optionally, at block 1512 the method 1500 may further include fifth electrically connecting, subsequent to the fourth electrically connecting, the first ground bar and the second ground bar to the opposite surfaces of the center plate. For example, optionally after block 1510, the first ground bar 130 and the second ground bar 131 may be electrically connected (e.g., soldered) to the opposite surfaces of the center plate 124.

Optionally, at block 1514 the method 1500 may further include applying, subsequent to the fifth electrically connecting, an protective layer to cover the first set of coaxial cables and the second set of coaxial cables at least in a connection area with the first set of electrical contacts or the second set of electrical contacts. For example, optionally after block 1512, the protective layers 136 and 137 may be applied to cover the first set of coaxial cables 128 and the second set of coaxial cables 129 at least in a connection area with the first set of electrical contacts 114 or the second set of electrical contacts 115.

Optionally, at block 1516 the method 1500 may further include sixth electrically connecting a third EMI shielding bracket and a fourth EMI shielding bracket on the opposite surfaces of the inner mold assembly, where the third EMI shielding bracket covers at least a second portion of the first set of electrical contacts, and the second EMI shielding bracket covers at least a second portion of the second set of electrical contacts. For example, optionally after block 1514, the third EMI shielding bracket 122 and the fourth EMI shielding bracket 123 are electrically connected (e.g., laser-welded) on the opposite surfaces of the inner mold assembly such that the third EMI shielding bracket 122 covers at least the third portion 140 of the first set of electrical contacts 114 and the second EMI shielding bracket 123 covers at least the third portion 140 of the second set of electrical contacts 115.

In an implementation, electrically connecting the third EMI shielding bracket 122 and the fourth EMI shielding bracket 123 on the opposite surfaces of the inner mold assembly electrically connects the third EMI shielding bracket 122 to the first ground bar 130 and electrically connects the fourth EMI shielding bracket 123 to the second ground bar 131.

Figure 3:
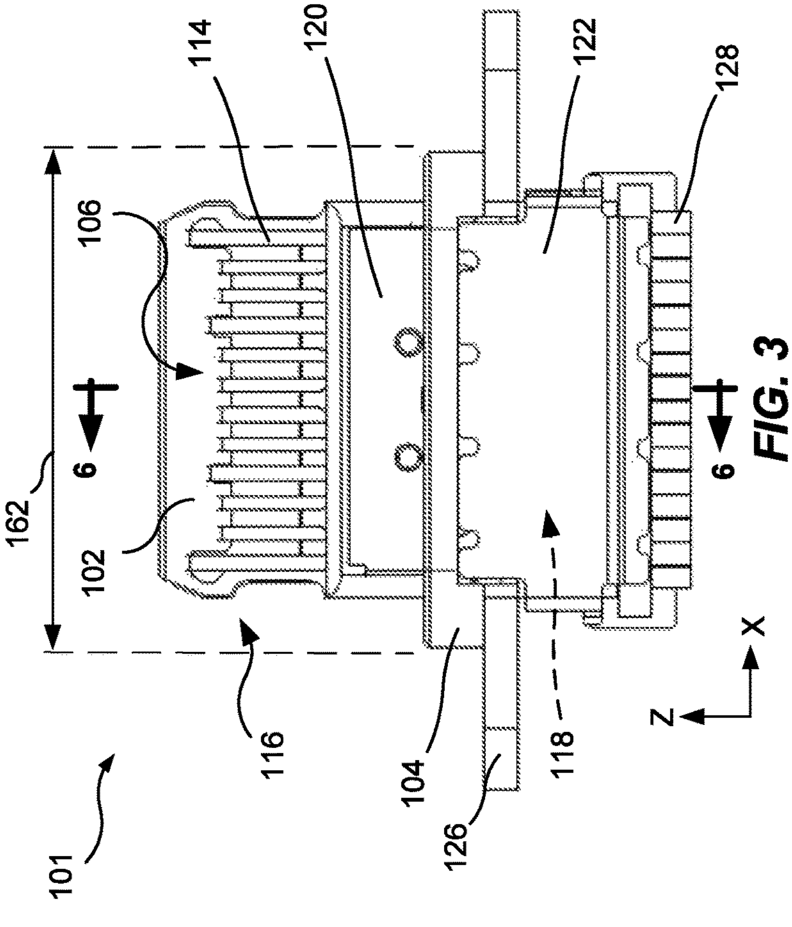
FIG. 3 is a top view of the receptacle connector assembly of the electrical connector assembly of FIG. 1, and the bottom view is a mirror image.
Figure 5:
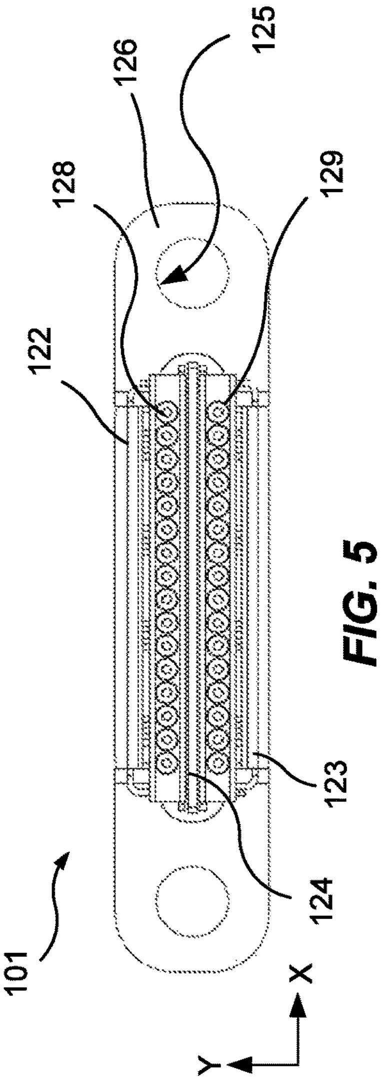
FIG. 5 is a back view of the receptacle connector assembly of the electrical connector assembly of FIG. 1.
Figure 6:
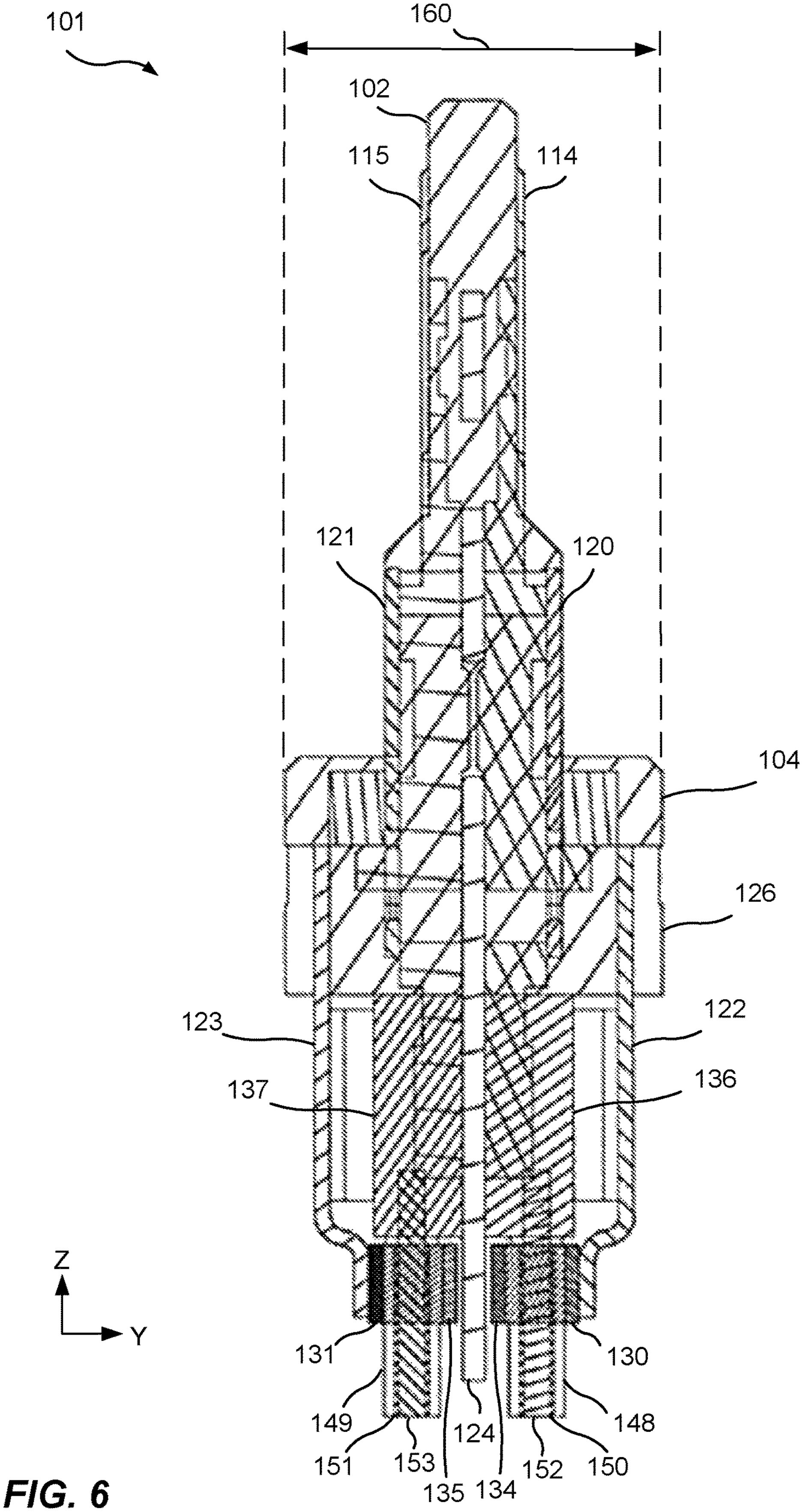
FIG. 6 is a cross-sectional view of the receptacle connector assembly along line 6-6 of FIG. 3.

At block 1518 the method 1500 may further include attaching a tongue member onto the inner assembly subsequent to the second electrically connecting, where the tongue member has a body with a first tongue surface and a second tongue surface opposite the first tongue surface both extending between a first tongue end and a second tongue end, where the body has a shoulder extending adjacent to the second tongue end from the first tongue surface and from the second tongue surface, and the shoulder has a cross-sectional area within a receptacle opening size limit. For example, after block 1506, and also optionally after block 1516, the tongue member 102 is attached (e.g., molded) onto the inner assembly, where the tongue member 102 has a body with the first tongue surface 106 and the second tongue surface 108 opposite the first tongue surface both extending between the first tongue end 110 and the second tongue end 112, where the body has the shoulder 104 extending adjacent to the second tongue end 11 from the first tongue surface 106 and from the second tongue surface 108, and the shoulder 104 has a cross-sectional area within a receptacle opening size limit, for example, as shown in FIGS. 3 and 6.

Optionally, at block 1520 the method 1500 may further include connecting a coaxial connector to a back end of the first set of coaxial cables and the second set of coaxial cables. For example, the coaxial cable connector 145 may be connected to a back end of the first set of coaxial cables 128 and the second set of coaxial cables 129.

Optionally, the electrically connecting in any of the above blocks may include, but is not limited to, laser welding, soldering, Anisotropic conductive film (ACF) bonding, etc.

Optionally, the first set of electrical contacts 114 each extend through the shoulder 104 of the tongue member 102 between the first contact end 116 and the second contact end 118 that are on opposite sides of the shoulder 104. Optionally, the first set of electrical contacts 114 at the first contact end 116 are attached to the first tongue surface 106 at the first tongue end 110. Optionally, the first set of electrical contacts 114 at the second contact end extend beyond the second tongue end 112. Optionally, the second set of electrical contacts 115 each extend through the shoulder 104 of the tongue member 102 between the third contact end 117 and the fourth contact end 119. Optionally, the second set of electrical contacts 115 at the third contact end 117 are attached to the second tongue surface 108 at the first tongue end 110. Optionally, the second set of electrical contacts 115 at the fourth contact end 119 extend beyond the second tongue end 112.

Optionally, the first portion 138 of the first set of electrical contacts 114 is between the first contact end 116 of the first set of electrical contacts 114 and the shoulder 104 of the tongue member 102. Optionally, the second portion 139 of the second set of electrical contacts 115 is between the third contact end 117 of the second set of electrical contacts 115 and the shoulder 104 of the tongue member 102. Optionally, the third portion 140 of the first set of electrical contacts 114 is between the shoulder 104 of the tongue member 102 and the second contact end 118 of the first set of electrical contacts 114. Optionally, the fourth portion 141 of the second set of electrical contacts 115 is between the shoulder 104 of the tongue member 102 and the fourth contact end 119 of the second set of electrical contacts 115.

Optionally, the mounting member 126 surrounds the shoulder 104 and is configured for mechanically mounting the electrical connector assembly 100 to a wall of a device enclosure, for example, as shown in FIG. 13. Optionally, the mounting member 126 may be further configured to electrically connect at least one of the first EMI shielding bracket 120 or the second EMI shielding bracket 121 to the device enclosure. Optionally, the mounting member 126 may be a metal injection molded component assembled onto the shoulder 104 of the tongue member 102.

In one non-limiting example implementation, a method of making the electrical connector assembly 100 may include one or more of the following:

(1) each one of the first set of electrical contacts 114 and the second set of electrical contacts 115 includes: contacts formed by stamping, and an inner mold formed by molding, (2) the center plate 124, the EMI shielding brackets 120, 121, 122, 123, and the ground bars 130, 131 are also formed by stamping, (3) the first set of electrical contacts 114, the second set of electrical contacts 115, and the center plate 124 are first assembled as an inner mold assembly, (4) the first and second EMI shielding brackets 120, 121 are then assembled onto the inner mold assembly, (5) the mounting member 126, which may be a metal interactive mold, is then laser-welded to the inner mold assembly, (6) the tongue member 102 is then molded onto the inner mold assembly, (7) the ground bars 130, 131 are soldered to the ground layer 148 or 149 of a respective set of cables 128, 129, (8) the set of cables 128, 129 are then soldered to the inner mold assembly, (9) the ground bars 130, 131 are then soldered to the center plate 124,

(10) UV glue (e.g., protective layers 136 and 137) is then applied to cover the cables 128, 129, and

(11) the third and fourth EMI shielding brackets 122, 123 are then assembled onto the electrical connector assembly 100.

In some implementations, for example, the first and second EMI shielding brackets 120, 121 may have mechanical features that interlock with corresponding mechanical features of the center plate 124. Alternatively or additionally, the first EMI shielding bracket 120 may have mechanical features that interlock with corresponding mechanical features of the second EMI shielding bracket 121. Alternatively or additionally, the first and second EMI shielding brackets 120, 121 may be laser-welded to the center plate 124 and/or to each other. In some implementations, the first and second EMI shielding brackets 120, 121 are electrically connected the center plate 124.

Similarly, the third and fourth EMI shielding brackets 122, 123 may have mechanical features that interlock with corresponding mechanical features of the center plate 124. Alternatively or additionally, the third EMI shielding bracket 122 may have mechanical features that interlock with corresponding mechanical features of the fourth EMI shielding bracket 123. Alternatively or additionally, the third and fourth EMI shielding brackets 122, 123 may be laser-welded to the center plate 124 and/or to each other. In some implementations, the third and fourth EMI shielding brackets 122, 123 are electrically connected the center plate 124.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any implementation described herein as "exemplary" is not necessarily to be construed as preferred or advantageous over other implementations. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An electrical connector, comprising:

a shell-less receptacle connector that excludes an electromagnetic interference (EMI) shielding outer metal shell, the shell-less receptacle connector including:

a tongue member having a body with a first tongue surface extending between a first tongue end and a second tongue end and having a shoulder extending from the first tongue surface adjacent to the second tongue end, wherein the shoulder has a cross-sectional area within a size limit of a receptacle opening defined by one or more internal walls through a side wall of a device enclosure;

a first set of electrical contacts each extending through the shoulder of the tongue member between a first contact end and a second contact end that are on opposite sides of the shoulder, wherein the first set of electrical contacts at the first contact end are attached to the first tongue surface at the first tongue end, wherein the first set of electrical contacts at the second contact end extend beyond the second tongue end; and a first EMI shielding bracket covering at least a first portion of the first set of electrical contacts between the first contact end and the shoulder of the tongue member.

2. The electrical connector of claim 1, wherein the body of the tongue member has a second tongue surface opposite the first tongue surface and extending between the first tongue end and the second tongue end, wherein the shoulder further extends from the second tongue surface adjacent to the second tongue end;

wherein the shell-less receptacle connector further comprises:

a second set of electrical contacts each extending through the shoulder of the tongue member between a third contact end and a fourth contact end, wherein the second set of electrical contacts at the third contact end are attached to the second tongue surface at the first tongue end, wherein the second set of electrical contacts at the fourth contact end extend beyond the second tongue end; and a second EMI shielding bracket covering at least a first portion of the second set of electrical contacts between the first contact end and the shoulder of the tongue member.

3. The electrical connector of claim 2, wherein the first EMI shielding bracket and the second EMI shielding bracket form a Faraday cage enclosing at least the first portion of the first set of electrical contacts and the first portion of the second set of electrical contacts.

4. The electrical connector of claim 2, wherein the shell-less receptacle connector further comprises:

a center plate having a first center plate surface facing the first set of electrical contacts and a second center plate surface opposite the first center plate surface and facing the second set of electrical contacts, wherein the first EMI shielding bracket and the second EMI shielding bracket are electrically connected to the center plate.

5. The electrical connector of claim 2, wherein the shell-less receptacle connector further comprises:

a third EMI shielding bracket covering at least a second portion of the first set of electrical contacts between the shoulder of the tongue member and the second contact end; and a fourth EMI shielding bracket covering at least a second portion of the second set of electrical contacts between the shoulder of the tongue member and the second contact end.

6. The electrical connector of claim 5, wherein the third EMI shielding bracket and the fourth EMI shielding bracket further form a Faraday cage enclosing at least the first portion of the first set of electrical contacts, the second portion of the first set of electrical contacts, the first portion of the second set of electrical contacts, and the second portion of the second set of electrical contacts.

7. The electrical connector of claim 5, further comprising:

a first set of cables each electrically connected to a respective one of the first set of electrical contacts at the second contact end; and a second set of cables each electrically connected to a respective one of the second set of electrical contacts at the second contact end.

8. The electrical connector of claim 7, wherein the shell-less receptacle connector further comprises:

a first ground bar extending across and electrically connected to the first set of cables at the second contact end; and a second ground bar extending across and electrically connected to the second set of cables at the second contact end.

9. The electrical connector of claim 8, wherein the first set of cables comprise first coaxial cables each having a first ground layer, wherein the second set of cables comprise second coaxial cables each having a second ground layer, wherein the first ground bar is electrically connected to each first ground layer, wherein the second ground bar is electrically connected to each second ground layer.

10. The electrical connector of claim 8, wherein the third EMI shielding bracket is electrically connected to the first ground bar, and wherein the fourth EMI shielding bracket is electrically connected to the second ground bar.

11. The electrical connector of claim 2, wherein the shell-less receptacle connector further comprises a mounting member extending from the shoulder and configured for mechanically mounting the shell-less receptacle connector to the side wall of the device enclosure, wherein the mounting member is further configured to electrically connect at least one of the first EMI shielding bracket or the second EMI shielding bracket to the device enclosure.

12. The electrical connector of claim 11, wherein the mounting member is a metal injection molded component assembled onto the shoulder of the tongue member.

13. The electrical connector of claim 1, further comprising:

a first set of coaxial cables having a first cable end and a second cable end, wherein each coaxial cable of the first set of coaxial cables is electrically connected to a respective one of the first set of electrical contacts at the second contact end; and a coaxial connector electrically connected to the second cable end of the first set of coaxial cables.

14. An electrical connector kit, comprising:

a receptacle connector kit configured for assembling a shell-less receptacle connector that excludes an electromagnetic interference (EMI) shielding outer metal shell, the receptacle connector kit including:

a tongue member having a body with a first tongue surface extending between a first tongue end and a second tongue end and having a shoulder extending from the first tongue surface adjacent to the second tongue end, wherein the shoulder has a cross-sectional area within a size limit of a receptacle opening defined by one or more internal walls through a side wall of a device enclosure;

a first set of electrical contacts each extendable through the shoulder of the tongue member between a first contact end and a second contact end that are on opposite sides of the shoulder, wherein the first set of electrical contacts at the first contact end are attachable to the first tongue surface at the first tongue end, wherein the first set of electrical contacts at the second contact end are extendable beyond the second tongue end; and a first EMI shielding bracket configured to cover at least a first portion of the first set of electrical contacts positionable between the first contact end and the shoulder of the tongue member.

15. The electrical connector kit of claim 14, wherein the body of the tongue member has a second tongue surface opposite the first tongue surface and extending between the first tongue end and the second tongue end, wherein the shoulder further extends from the second tongue surface adjacent to the second tongue end;

wherein the receptacle connector kit further comprises:

a second set of electrical contacts each extendable through the shoulder of the tongue member between a third contact end and a fourth contact end, wherein the second set of electrical contacts at the third contact end are attachable to the second tongue surface at the first tongue end, wherein the second set of electrical contacts at the fourth contact end are extendable beyond the second tongue end; and a second EMI shielding bracket configured to cover at least a first portion of the second set of electrical contacts positionable between the first contact end and the shoulder of the tongue member.

16. The electrical connector kit of claim 15, wherein the receptacle connector kit further comprises:

a third EMI shielding bracket configured to cover at least a second portion of the first set of electrical contacts positionable between the shoulder of the tongue member and the second contact end; and a fourth EMI shielding bracket configured to cover at least a second portion of the second set of electrical contacts positionable between the shoulder of the tongue member and the second contact end.

17. The electrical connector kit of claim 16, further comprising:

a first set of cables each electrically connectable to a respective one of the first set of electrical contacts at the second contact end; and a second set of cables each electrically connectable to a respective one of the second set of electrical contacts at the second contact end.

18. The electrical connector kit of claim 17, wherein the receptacle connector kit further comprises:

a first ground bar extendable across and electrically connectable to the first set of cables at the second contact end; and a second ground bar extendable across and electrically connectable to the second set of cables at the second contact end.

19. The electrical connector kit of claim 15, wherein the receptacle connector kit further comprises a mounting member configured to extend from the shoulder and configured for mechanically mounting the shell-less receptacle connector to the side wall of the device enclosure, wherein the mounting member is further configured to electrically connect at least one of the first EMI shielding bracket or the second EMI shielding bracket to the device enclosure.

20. A computing device comprising an electrical connector configured to electrically connect the computing device to another computing device, the electrical connector including:

a first set of coaxial cables having a first cable end and a second cable end;

a coaxial connector electrically connected to the second cable end; and a shell-less receptacle connector that excludes an electromagnetic interference (EMI) shielding outer metal shell, the shell-less receptacle connector, including:

a tongue member having a body with a first tongue surface extending between a first tongue end and a second tongue end and having a shoulder extending from the first tongue surface adjacent to the second tongue end, wherein the shoulder has a cross-sectional area within a size limit of a receptacle opening defined by one or more internal walls through a side wall of a device enclosure;

a first set of electrical contacts each extending through the shoulder of the tongue member between a first contact end and a second contact end that are on opposite sides of the shoulder, wherein the first set of electrical contacts at the first contact end are attached to the first tongue surface at the first tongue end, wherein the first set of electrical contacts at the second contact end extend beyond the second tongue end, wherein each coaxial cable of the first set of coaxial cables is electrically connected to a respective one of the first set of electrical contacts at the second contact end; and a first EMI shielding bracket covering at least a first portion of the first set of electrical contacts between the first contact end and the shoulder of the tongue member.

21. A method of manufacturing an electrical connector that comprises a shell-less receptacle connector that excludes an electromagnetic interference (EMI) shielding outer metal shell, the method comprising:

assembling a first set of electrical contacts and a second set of electrical contacts on opposite surfaces of a center plate to obtain an inner assembly;

first electrically connecting, subsequent to the assembling, a first EMI shielding bracket and a second EMI shielding bracket on the opposite surfaces of the center plate, wherein the first EMI shielding bracket covers at least a first portion of the first set of electrical contacts, wherein the second EMI shielding bracket covers at least a first portion of the second set of electrical contacts;

second electrically connecting, subsequent to the first electrically connecting, a mounting member to the inner assembly; and attaching a tongue member onto the inner assembly subsequent to the second electrically connecting, wherein the tongue member has a body with a first tongue surface and a second tongue surface opposite the first tongue surface both extending between a first tongue end and a second tongue end, wherein the body has a shoulder extending adjacent to the second tongue end from the first tongue surface and from the second tongue surface, wherein the shoulder has a cross-sectional area within a size limit of a receptacle opening defined by one or more internal walls through a side wall of a device enclosure.

22. The method of claim 21, further comprising:

third electrically connecting a first ground bar across a first set of coaxial cables to a first ground layer of the first set of coaxial cables and a second ground bar across a second set of coaxial cables to a second ground layer of the second set of coaxial cables;

fourth electrically connecting, subsequent to the third electrically connecting, each coaxial cable of the first set of coaxial cables to a respective one of the first set of electrical contacts and each coaxial cable of the second set of coaxial cables to a respective one of the second set of electrical contacts;

fifth electrically connecting, subsequent to the fourth electrically connecting, the first ground bar and the second ground bar to the opposite surfaces of the center plate; and applying, subsequent to the fifth electrically connecting, a protective layer to cover the first set of coaxial cables and the second set of coaxial cables at least in a connection area with the first set of electrical contacts or the second set of electrical contacts.

23. The method of claim 22, further comprising:

connecting a coaxial connector to a back end of the first set of coaxial cables and the second set of coaxial cables.

24. The method of claim 22, further comprising:

sixth electrically connecting a third EMI shielding bracket and a fourth EMI shielding bracket on the opposite surfaces of the inner assembly, wherein the attaching is further performed subsequent to the sixth electrically connecting, wherein the third EMI shielding bracket covers at least a second portion of the first set of electrical contacts, wherein the second EMI shielding bracket covers at least a second portion of the second set of electrical contacts.

25. The method of claim 24, wherein the sixth electrically connecting electrically connects the third EMI shielding bracket to the first ground bar and connects the fourth EMI shielding bracket to the second ground bar.

26. The method of claim 24, wherein the first set of electrical contacts each extend through the shoulder of the tongue member between a first contact end and a second contact end that are on opposite sides of the shoulder, wherein the first set of electrical contacts at the first contact end are attached to the first tongue surface at the first tongue end, wherein the first set of electrical contacts at the second contact end extend beyond the second tongue end; and wherein the second set of electrical contacts each extend through the shoulder of the tongue member between a third contact end and a fourth contact end, wherein the second set of electrical contacts at the third contact end are attached to the second tongue surface at the first tongue end, wherein the second set of electrical contacts at the fourth contact end extend beyond the second tongue end.

27. The method of claim 26, wherein the first portion of the first set of electrical contacts is between the first contact end of the first set of electrical contacts and the shoulder of the tongue member;

wherein the first portion of the second set of electrical contacts is between the first contact end of the second set of electrical contacts and the shoulder of the tongue member;

wherein the second portion of the first set of electrical contacts is between the shoulder of the tongue member and the second contact end of the first set of electrical contacts; and wherein the fourth EMI shielding bracket covers at least a second portion of the second set of electrical contacts between the shoulder of the tongue member and the second contact end of the second set of electrical contacts.

28. The method of claim 21, wherein the mounting member extends from the shoulder and is configured for mechanically mounting the electrical connector to the side wall of the device enclosure, wherein the mounting member is further configured to electrically connect at least one of the first EMI shielding bracket or the second EMI shielding bracket to the device enclosure.

29. The method of claim 21, wherein the mounting member is a metal injection molded component assembled onto the shoulder of the tongue member.

* * * * *